(12) United States Patent
Ohshima et al.

(10) Patent No.: US 8,848,406 B2
(45) Date of Patent: Sep. 30, 2014

(54) SINGLE-PHASE VOLTAGE TYPE AC/DC CONVERTER, THREE-PHASE VOLTAGE TYPE AC/DC CONVERTER, AND STABILIZATION CONTROL METHOD

(75) Inventors: Masaaki Ohshima, Tokyo (JP); Shuichi Ushiki, Tokyo (JP); Yasuhiro Genjima, Tokyo (JP); Kiyomi Watanabe, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 473 days.

(21) Appl. No.: 13/189,752

(22) Filed: Jul. 25, 2011

(65) Prior Publication Data
US 2012/0051104 A1 Mar. 1, 2012

(30) Foreign Application Priority Data
Aug. 31, 2010 (JP) ................................ 2010-194632

(51) Int. Cl.
| H02M 1/12 | (2006.01) |
| H02M 5/40 | (2006.01) |
| H02J 3/16 | (2006.01) |
| H02M 7/219 | (2006.01) |
| H02J 3/14 | (2006.01) |
| H02M 7/5387 | (2007.01) |

(52) U.S. Cl.
CPC .................. *H02M 7/219* (2013.01); *H02J 3/16* (2013.01); *H02M 2007/53876* (2013.01); *Y04S 20/222* (2013.01); *Y02E 40/34* (2013.01); *H02J 3/14* (2013.01); *Y02B 70/3225* (2013.01)
USPC .................. 363/44; 363/34; 363/87; 363/129

(58) Field of Classification Search
USPC ............ 363/44, 81, 84, 87, 89, 125, 127, 129
See application file for complete search history.

(56) References Cited

U.S. PATENT DOCUMENTS 4,964,027 A * 10/1990 Cook et al. ...................... 363/40
6,310,787 B2 * 10/2001 Ito et al. .......................... 363/34
(Continued)

FOREIGN PATENT DOCUMENTS

| JP | 2002325465 | 11/2002 |
| JP | 2007-236083 | 9/2007 |

(Continued)

OTHER PUBLICATIONS

Partial translation of Japanese Office Action dated Jan. 14, 2014 corresponding to Japanese Patent App. No. 2010194632, 3 pp.

*Primary Examiner* — Adolf Berhane
*Assistant Examiner* — Gustavo Rosario Benitez
(74) *Attorney, Agent, or Firm* — Ohlandt Greeley Ruggiero & Perle L.L.P.

(57) ABSTRACT

A method and a single-phase voltage type AC/DC converting device and a three-phase voltage type AC/DC converting device arranged between a load and a distribution network. The converting devices are capable of contributing to stabilize a system frequency and a system voltage. By applying an autonomous parallel operation control technique of an AC/DC converter to a load, which receives power from a distribution network, drooping characteristics (governor-free characteristics) for a frequency of active power and voltage-maintaining characteristics (V-Q characteristics) may be obtained. The governor-free characteristics automatically decrease and increase received power when the system frequency decreases and increases, so that even the load may contribute to stabilize the system frequency. The V-Q characteristics generates/absorbs reactive power so as to maintain a voltage at a receiving end constant regardless of load power to further stabilize the system voltage.

20 Claims, 14 Drawing Sheets

(56) References Cited

U.S. PATENT DOCUMENTS

| | | | |
|---|---|---|---|
| 6,937,488 B2* | 8/2005 | Eguchi | 363/97 |
| 2006/0256586 A1* | 11/2006 | Ohshima et al. | 363/16 |
| 2007/0200607 A1* | 8/2007 | Ohshima et al. | 327/256 |
| 2008/0067981 A1* | 3/2008 | Inaba et al. | 322/20 |
| 2009/0310390 A1* | 12/2009 | Ohshima et al. | 363/71 |
| 2010/0302825 A1* | 12/2010 | Ohshima et al. | 363/131 |

FOREIGN PATENT DOCUMENTS

| | | |
|---|---|---|
| JP | 2008172970 | 7/2008 |
| JP | 2009-219263 | 9/2009 |
| JP | 2009290993 | 12/2009 |

* cited by examiner

SINGLE-PHASE VOLTAGE TYPE AC/DC CONVERTER, THREE-PHASE VOLTAGE TYPE AC/DC CONVERTER, AND STABILIZATION CONTROL METHOD

BACKGROUND OF THE INVENTION

1. Field of the Invention

The present invention relates to a single-phase voltage type AC/DC converter, a three-phase voltage type AC/DC converter, and a stabilization control method capable of applying an autonomous parallel operation control technique to a load that makes a direct current from an alternating current of a distribution network.

2. Description of the Related Art

When a plurality of DC energy sources are connected in parallel to the distribution network to perform parallel operation, a three-phase voltage type AC/DC converter and a single-phase voltage type AC/DC converter capable of performing autonomous parallel operation in which each device autonomously controls output deviation are known (refer to, for example, Japanese Laid-Open Patent Application Publication No. 2007-236083 and Japanese Laid-Open Patent Application Publication No. 2009-219263).

SUMMARY OF THE INVENTION

On the other hand, the load, which converts the power from the distribution network to the direct current to receive, merely consumes the power as needed, and variation of a system frequency and a system voltage is not taken into account. Therefore, even when a load of the system increases and the system frequency decreases, the load consumes the power as needed, so that the system frequency might be unstable. In contrast, when the system frequency increases due to massive load drop and the like also, the system frequency might be unstable. Also, when power consumption of the load increases, a receiving voltage might decrease. Although it is conventionally required that an electrical power supplier takes measures to avoid such variation of the system frequency and the system voltage, the variation of the power consumption of the load is large and there is a problem that the electrical power supplier alone cannot respond to the same.

Therefore, in order to solve the above-described problem, an object of the present invention is to provide a single-phase voltage type AC/DC converter and a three-phase voltage type AC/DC converter arranged between the load and the distribution network and is capable of contributing to stabilization of the system frequency and the system voltage, and a stabilization control method of the system frequency and the system voltage.

In order to achieve the above-described object, the single-phase voltage type AC/DC converter, the three-phase voltage type AC/DC converter, and the stabilization control method according to the present invention apply the autonomous parallel operation control technique of the AC/DC converter for the load, which receives power from the distribution network.

Specifically, a single-phase voltage type AC/DC converter according to the present invention is provided with a single-phase voltage type AC/DC converting circuit, which has internal equivalent impedance as seen from an AC terminal, for converting single-phase AC power from a single-phase AC source to DC power to output from a DC terminal according to pulse width modulation of gate signals generated based on a PWM command;

a phase difference generating circuit, which has a phase delay single-phase AC generator for delaying a phase of a single-phase AC output voltage at the AC terminal and generating a delay single-phase alternating current, for generating a phase difference voltage corresponding to phase difference between the single-phase AC output voltage at the AC terminal and an internal electromotive voltage of the single-phase voltage type AC/DC converting circuit based on the delay single-phase alternating current;

an upper level voltage control circuit to which an upper command vector composed of a voltage amplitude command value and a frequency command value of the single-phase AC output voltage at the AC terminal is inputted for outputting a voltage command signal and a frequency command signal generated such that the amplitude and the frequency of the single-phase AC output voltage at the AC terminal approach the command values by the upper command vector based on the inputted upper command vector, the phase difference voltage from the phase difference generating circuit, and the single-phase AC output voltage at the AC terminal;

a frequency control circuit for determining an electrical angle of the internal electromotive voltage of the single-phase voltage type AC/DC converting circuit to generate a generated electrical angle based on a reference frequency to define the frequency of the single-phase AC output voltage at the AC terminal, the frequency command signal from the upper level voltage control circuit, and an output signal from the phase difference generating circuit; and a lower level voltage control circuit for outputting a signal generated such that the amplitude, the frequency, and the phase of the single-phase AC output voltage approach a synthesized value of a reference voltage to define the amplitude of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the upper level voltage control circuit.

Also, a three-phase voltage type AC/DC converter according to the present invention is provided with a three-phase voltage type AC/DC converting circuit, which has internal equivalent impedance as seen from an AC terminal, for converting three-phase AC power from a three-phase AC source to DC power to output from a DC terminal according to pulse width modulation of gate signals generated based on a PWM command;

a UM converting circuit for converting a three-phase output voltage at the AC terminal on a dq rotational coordinate space of which d-axis component is a component related to amplitude of the three-phase output voltage and of which q-axis component is a component related to frequency difference to output;

an upper level voltage control circuit to which an upper command vector composed of a voltage amplitude command value and a frequency command value of the three-phase output voltage at the AC terminal is inputted for outputting a signal generated such that the amplitude and the frequency of the three-phase output voltage at the AC terminal approach the command values by the upper command vector based on the inputted upper command vector and an output voltage vector from the UM converting circuit as a voltage command vector;

a lower level voltage control circuit for outputting the signal generated such that the amplitude and the phase of the three-phase output voltage approach a synthesized value of a reference voltage vector and the voltage command vector as the PWM command based on the reference voltage vector to define the amplitude and the phase of the three-phase output voltage at the AC terminal, the output voltage vector from the UM converting circuit, and the voltage command vector from the upper level voltage control circuit; and a frequency control circuit for synchronizing a generated value generated based on a reference frequency to define the frequency of the three-phase output voltage at the AC terminal and the q-axis component of the output voltage vector from the UM converting circuit with a rotational angle of a transformation matrix in the UM converting circuit.

By applying an autonomous parallel operation control technique of the AC/DC converter to the load, which receives the power from the distribution network, drooping characteristics (governor-free characteristics) for a frequency of active power and voltage-maintaining characteristics (V-Q characteristics) may be obtained. The governor-free characteristics are the characteristics to automatically decrease received power when the system frequency decreases and automatically increase the received power when the system frequency increases, so that even the load may contribute to stabilize the system frequency. Further, the V-Q characteristics generates/absorbs reactive power so as to maintain a voltage at receiving end constant regardless of load power, so that this may also contribute to stabilize the system voltage.

Therefore, the present invention may provide the single-phase voltage type AC/DC converter and the three-phase voltage type AC/DC converter arranged between the load and the distribution network and is capable of contributing to stabilize the system frequency and the system voltage.

Also, another single-phase voltage type AC/DC converter according to the present invention is provided with a single-phase voltage type AC/DC converting circuit, which has internal equivalent impedance as seen from an AC terminal, for converting DC power from a DC voltage type connected to a DC terminal to single-phase AC power and outputting the single-phase AC power to the AC terminal or converting single-phase AC power from a single-phase AC source connected to the AC terminal to DC power and outputting the DC power to the DC terminal, according to a pulse width modulation of a gate signal generated based on a PWM command;

a phase difference generating circuit, which has a phase delay generator for delaying a phase of a single-phase AC output voltage at the AC terminal to generate a delay single-phase alternating current, for generating a phase difference voltage corresponding to phase difference between the single-phase AC output voltage at the AC terminal and an internal electromotive voltage of the single-phase voltage type AC/DC converting circuit based on the delay single-phase alternating current;

an upper level voltage control circuit to which an upper command vector composed of a voltage amplitude command value and a frequency command value of the singe-phase AC output voltage at the AC terminal is inputted for outputting a voltage command signal and a frequency command signal generated such that the amplitude and the frequency of the single-phase AC output voltage at the AC terminal approach the command values by the upper command vector based on the inputted upper command vector, the phase difference voltage from the phase difference generating circuit, and the single-phase AC output voltage at the AC terminal;

a frequency control circuit for determining an electrical angle of the internal electromotive voltage of the single-phase voltage type AC/DC converting circuit based on a reference frequency to define the frequency of the single-phase AC output voltage at the AC terminal, the frequency command signal from the upper level voltage control circuit, and an output signal from the phase difference generating circuit to generate a generated electrical angle; and a lower level voltage control circuit for outputting a signal generated such that the amplitude, the frequency, and the phase of the single-phase AC output voltage approach a synthesized value of a reference voltage to define the amplitude of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the upper level voltage control circuit.

Further, another three-phase voltage type AC/DC converter according to the present invention is provided with a three-phase voltage type AC/DC converting circuit, which has internal equivalent impedance as seen from an AC terminal, for converting DC power from a DC voltage type connected to a DC terminal to three-phase AC power and outputting the three-phase AC power to the AC terminal or converting three-phase AC power from a three-phase AC source connected to the AC terminal to DC power and outputting the DC power to the DC terminal, according to a pulse width modulation of a gate signal generated based on a PWM command;

a UM converting circuit for converting a three-phase output voltage at the AC terminal on a dq rotational coordinate space of which d-axis component is a component related to amplitude of the three-phase output voltage and of which q-axis component is a component related to frequency difference to output;

an upper level voltage control circuit to which an upper command vector composed of a voltage amplitude command value and a frequency command value of the three-phase output voltage at the AC terminal is inputted for outputting a signal generated such that the amplitude and the frequency of the three-phase output voltage at the AC terminal approach the command values by the upper command vector as a voltage command vector based on the inputted upper command vector and an output voltage vector from the UM converting circuit;

a lower level voltage control circuit for outputting the signal generated such that the amplitude and the phase of the three-phase output voltage approach a synthesized value of a reference voltage vector and the voltage command vector as the PWM command based on the reference voltage vector to define the amplitude and the phase of the three-phase output voltage at the AC terminal, the output voltage vector from the UM converting circuit, and the voltage command vector from the upper level voltage control circuit; and a frequency control circuit for synchronizing a generated value generated based on a reference frequency to define the frequency of the three-phase output voltage at the AC terminal and the q-axis component of the output voltage vector from the UM converting circuit with a rotational angle of a transformation matrix in the UM converting circuit.

Since the single-phase voltage type AC/DC converter and the three-phase voltage type AC/DC converter may convert the alternating current to the direct current and convert the direct current to the alternating current, the load may be a storage battery. Not only charge of the storage battery but also discharge of the storage battery becomes possible according to the variation of the system frequency and the system voltage, so that it is possible to further contribute to the stabilization of the system frequency and the system voltage.

A stabilization control method of a single-phase system according to the present invention connects the AC terminal of the single-phase voltage type AC/DC converter to a distribution network of a single-phase alternating current, and the DC terminal of the single-phase voltage type AC/DC converter according to a device or devices; and adjusts the DC power between the single-phase voltage type AC/DC converter and the DC device such that frequency variation of a single-phase AC voltage of the distribution network decreases and adjusts magnitude of reactive power in the single-phase voltage type AC/DC converter such that voltage variation of the single-phase AC voltage of the distribution network decreases, according to relationship between the upper command vector and the frequency and the voltage amplitude value of the single-phase AC voltage of the distribution network.

A stabilization control method of a three-phase system according to the present invention connects the AC terminal of the three-phase voltage type AC/DC converter according to a distribution network of a three-phase alternating current, and the DC terminal of the three-phase voltage type AC/DC converter to a device or devices; and adjusts the DC power between the three-phase voltage type AC/DC converter and the DC device such that frequency variation of a three-phase AC voltage of the distribution network decreases and adjusts magnitude of reactive power in the three-phase voltage type AC/DC converter such that voltage variation of the three-phase AC voltage of the distribution network decreases, according to relationship between the upper command vector and the frequency and the voltage amplitude value of the three-phase AC voltage of the distribution network.

The autonomous parallel operation control technique may be applied to the load by connecting the single-phase voltage type AC/DC converter and the three-phase voltage type AC/DC converter between the load and the distribution network. Therefore, the present invention may provide the stabilization control method capable of contributing to the stabilization of the system frequency and the system voltage.

The stabilization control method according to the present invention obtains at least a piece of information out of the DC voltage and the direct current between the single-phase voltage type AC/DC converter and the DC device to perform comparison operation with a predetermined value; and inputting to the single-phase voltage type AC/DC converter as the frequency command value of the upper command vector.

Since the frequency command value is generated from the voltage to the load or a current value, it is possible to contribute to the stabilization of the system frequency and the system voltage according to a state of the load.

The present invention may provide the single-phase voltage type AC/DC converter and the three-phase voltage type AC/DC converter arranged between the load and the distribution network to be capable of contributing to the stabilization of the system frequency and the system voltage, and the stabilization control method of the system frequency and the system voltage.

DESCRIPTION OF THE PREFERRED EMBODIMENTS

Figure 1:
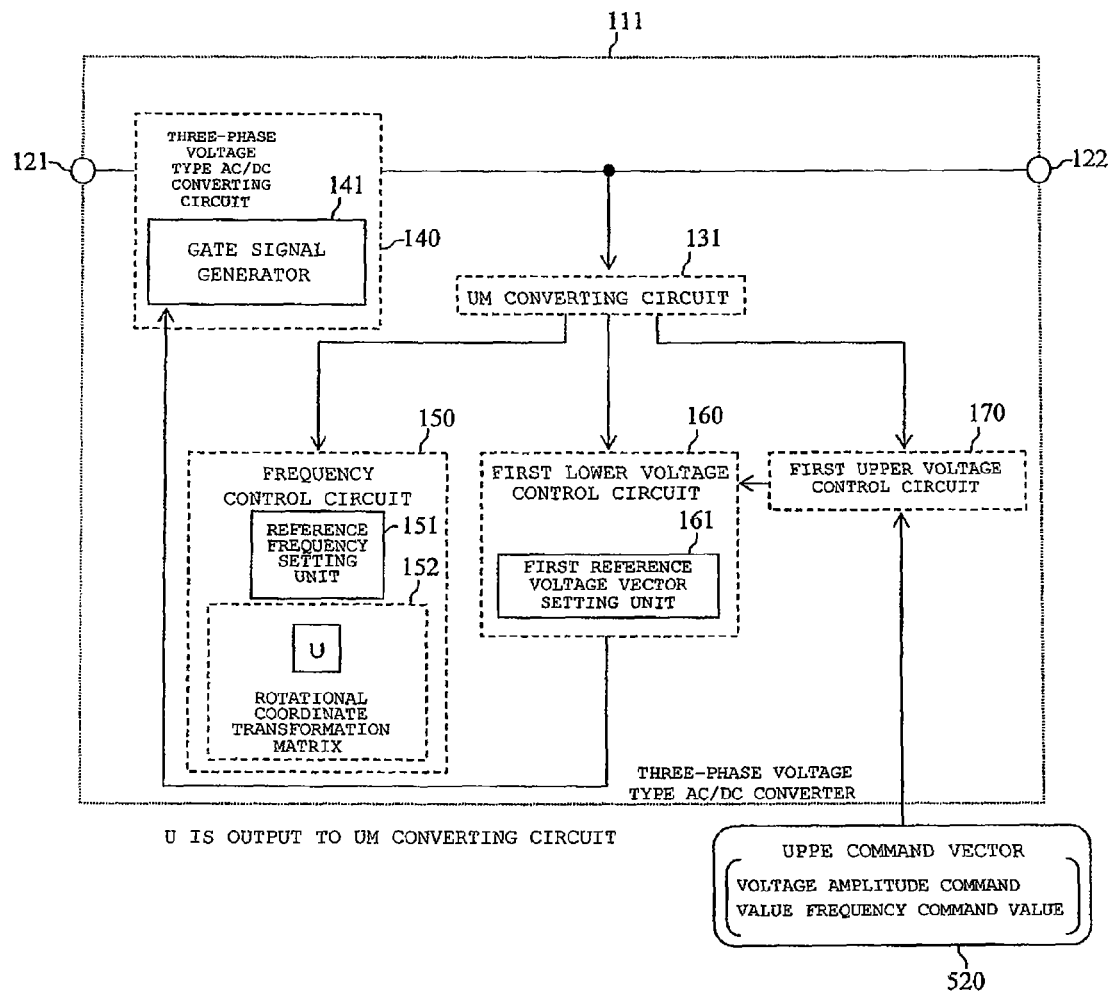
FIG. 1 is a schematic configuration diagram of a three-phase voltage type AC/DC converter according to the present invention.

Embodiments of the present invention are described with reference to the attached drawings. The embodiments hereinafter described are examples of the present invention, and the present invention is not limited to the following embodiments. Meanwhile, components to which an identical reference numeral is assigned in this description and the drawings are identical to each other.

(First Embodiment)

Figure 2:
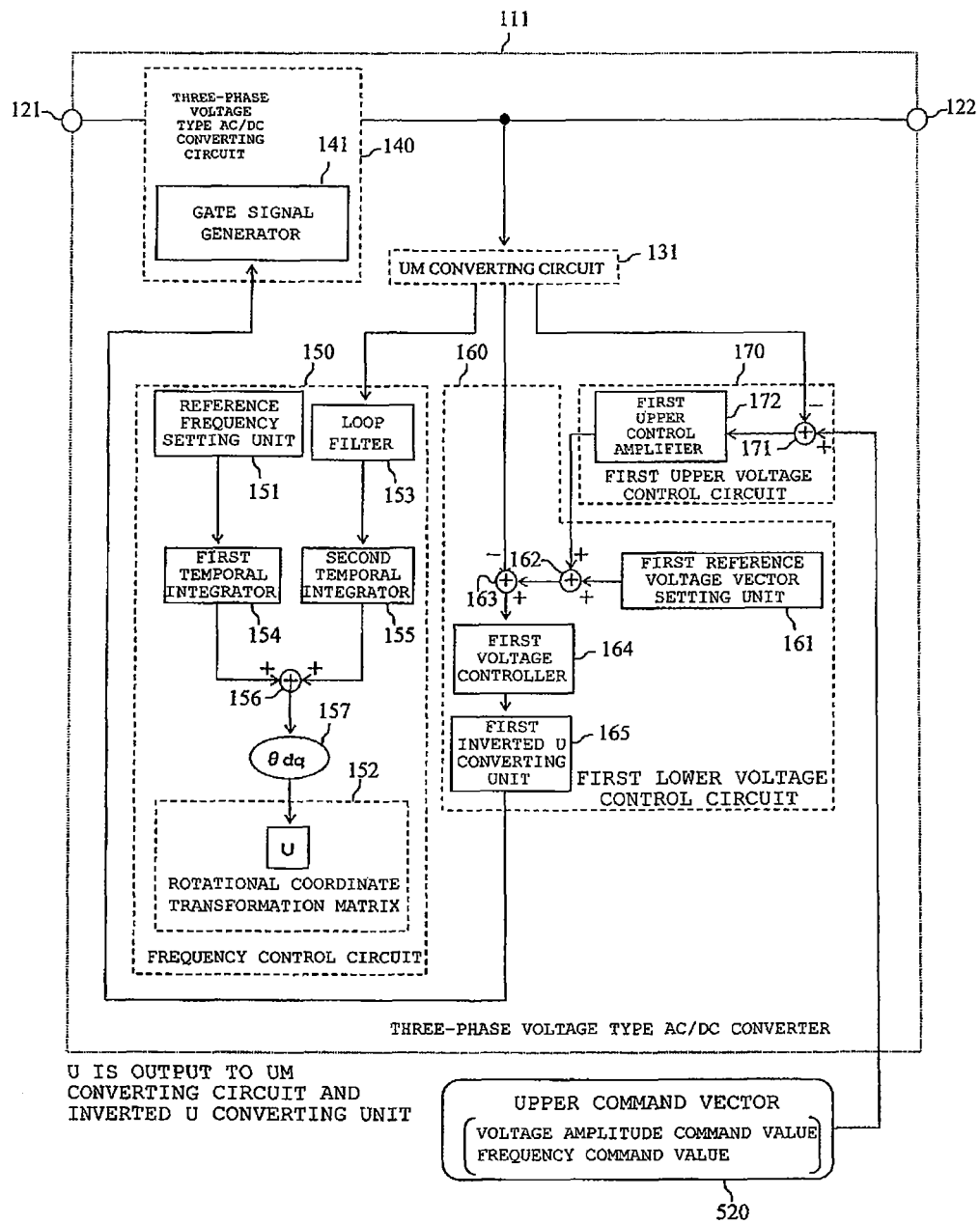
FIG. 2 is a schematic configuration diagram of the three-phase voltage type AC/DC converter according to the present invention.

FIGS. 1 and 2 are schematic configuration diagrams of a three-phase voltage type AC/DC converter according to this embodiment.

A three-phase voltage type AC/DC converter 111 illustrated in FIG. 1 is provided with a three-phase voltage type AC/DC converting circuit 140, which has internal equivalent impedance as seen from an AC terminal 122, for converting power from a DC voltage type connected to a DC terminal 121 to three-phase AC power to output from the AC terminal 122 or converting the three-phase AC power from a three-phase AC source connected to the AC terminal 122 to DC power to output from the DC terminal 121 according to a pulse width modulation of a gate signal generated based on a PWM command, a UM converting circuit 131 for converting a three-phase output voltage at the AC terminal 122 on a dq rotational coordinate space to output, a first upper level voltage control circuit 170 for outputting a signal generated based on an upper command vector 520 and an output voltage vector from the UM converting circuit 131 as a voltage command vector, a first lower level voltage control circuit 160 for outputting the signal generated based on a reference voltage vector, the output voltage vector from the UM converting circuit 131, and the voltage command vector from the first upper level voltage control circuit 170 as the PWM command, and a frequency control circuit 150 for synchronizing a generated value generated based on a reference frequency and a q-axis component of the output voltage vector from the UM converting circuit 131 with a rotational angle of a rotational coordinate transformation matrix 152 in the UM converting circuit 131.

The three-phase voltage type AC/DC converting circuit 140 converts the power from the three-phase AC source not illustrated to the DC power according to the pulse width modulation of the gate signal generated by a gate signal generator 141 based on the PWM command. The three-phase AC source may exemplify a distribution network, for example. Also, the three-phase voltage type AC/DC converting circuit 140 converts the power from the DC voltage type not illustrated to the three-phase AC power according to the pulse width modulation of the gate signal generated by the gate signal generator 141 based on the PWM command. The DC voltage type may exemplify a voltage type for independently outputting the DC voltage such as a battery, the voltage type for generating power by a method of generating power such as wind generation and rectifying to output the DC voltage, or the voltage type for controlling a voltage of a DC capacitor to output the DC voltage. In this case, it is also possible to further provide a blocking inductor between a connection point of the UM converting circuit 131 and the AC terminal 122 to output each phase of the three-phase output voltage from the AC terminal 122 through the blocking inductor. An outflow of a PWM component in the three-phase voltage type AC/DC converting circuit 140 to the AC terminal 122 may be prevented.

Figure 4:
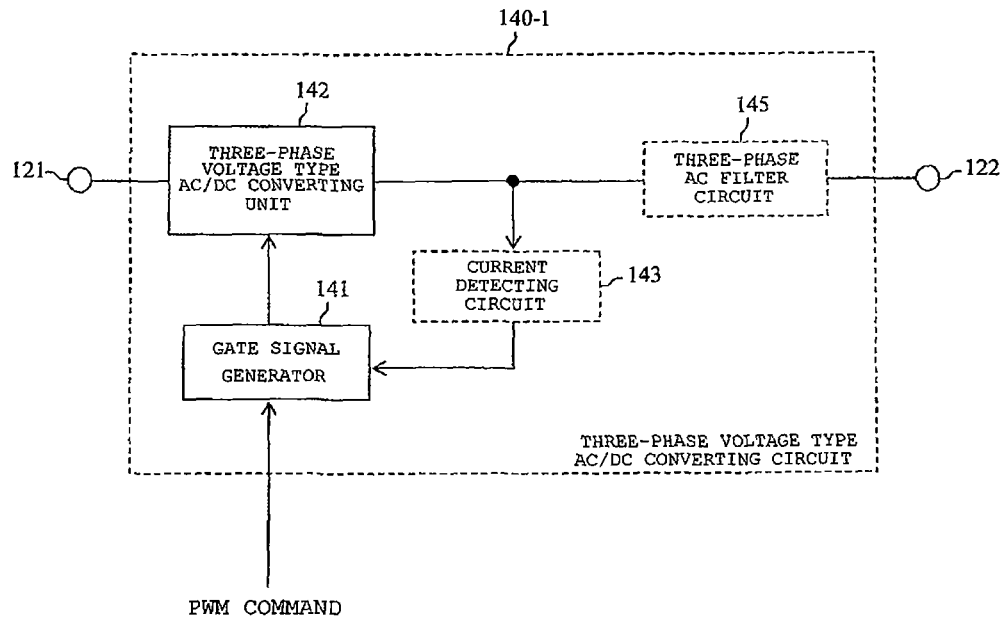
FIG. 4 is a schematic configuration diagram of a three-phase voltage type AC/DC converting circuit of the three-phase voltage type AC/DC converter according to the present invention.
Figure 5:
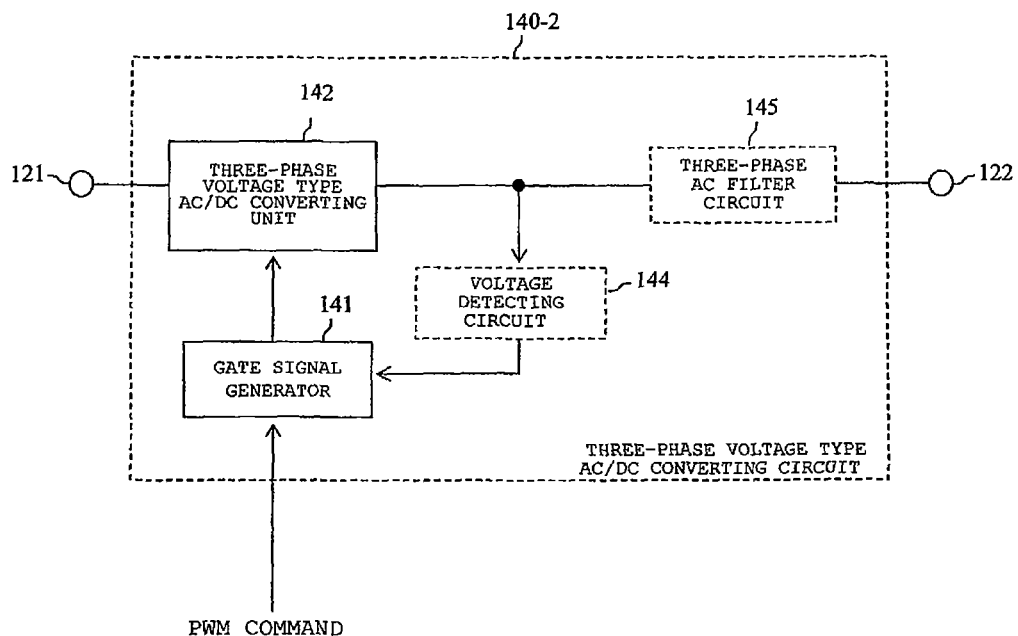
FIG. 5 is a schematic configuration diagram of the three-phase voltage type AC/DC converting circuit of the three-phase voltage type AC/DC converter according to the present invention.

FIGS. 4 and 5 are schematic configuration diagrams of the three-phase voltage type AC/DC converting circuit.

A three-phase voltage type AC/DC converting circuit 140-1 illustrated in FIG. 4 is provided with a three-phase voltage type AC/DC converting unit 142, which has the internal equivalent impedance as seen from the AC terminal 122, for receiving the power from the DC voltage type by the DC terminal 121 and converting the same to the three-phase AC power to output from the AC terminal 122 according to the pulse width modulation of the generated gate signal or converting the power from the distribution network connected to the AC terminal 122 to the DC power to output from the DC terminal 121 according to the pulse width modulation of the gate signal, a current detecting circuit 143 for detecting a three-phase output current from the three-phase voltage type AC/DC converting unit 142 or a three-phase input current from the AC terminal 122 to output the signal generated according to magnitude of the three-phase output current or the three-phase input current, the gate signal generator 141 for generating the gate signal such that difference between the PWM command and an output from the current detecting circuit 143 approaches zero to output, and a three-phase AC filter circuit 145 for removing a high-frequency component caused by the gate signal in the three-phase voltage type AC/DC converting unit 142 from the three-phase output voltage of the three-phase voltage type AC/DC converting unit 142 to output.

Also, a three-phase voltage type AC/DC converting circuit 140-2 illustrated in FIG. 5 is provided with a voltage detecting circuit 144 for detecting the three-phase output voltage from the three-phase voltage type AC/DC converting unit 142 or a three-phase input voltage from the AC terminal 122 to output the signal generated according to magnitude of the three-phase output voltage in place of the current detecting circuit 143 in FIG. 4. In this case, the gate signal generator 141 generates the gate signal such that the difference between the PWM command and the output from the voltage detecting circuit 144 approaches zero to output.

It is possible to allow the three-phase voltage type AC/DC converting unit 142 illustrated in FIGS. 4 and 5 to have the internal equivalent impedance by a control variable in the three-phase voltage type AC/DC converter 111 in FIG. 1 as described later or by connecting a resistance, a reactor, and a three-phase transformer or a combination of them on a side of the AC terminal 122 of the three-phase voltage type AC/DC converting circuits 140-1 and 140-2 in FIGS. 4 and 5. For example, the resistance or the reactor may be connected in series on the side of the AC terminal 122 of the three-phase voltage type AC/DC converting circuits 140-1 and 140-2, or when the resistance is further connected, the reactor may be connected in series on a subsequent stage of the resistance. Also, the three-phase transformer may be connected on the side of the AC terminal 122 of the three-phase voltage type AC/DC converting circuits 140-1 and 140-2. Also, when the reactor is connected on the side of the AC terminal 122 of the three-phase voltage type AC/DC converting circuits 140-1 and 140-2, the three-phase transformer may be connected on the subsequent stage of the reactor. Further, when the resistance is connected on the side of the AC terminal 122 of the three-phase voltage type AC/DC converting circuits 140-1 and 140-2 and the reactor is connected in series on the subsequent stage of the resistance, the three-phase transformer may be connected on the subsequent stage of the reactor. In this manner, the three-phase voltage type AC/DC converting unit 142 has the internal equivalent impedance, and according to this, the three-phase voltage type AC/DC converter 111 in FIG. 1 may be connected to a power system as the voltage type or a load.

By configuring the three-phase voltage type AC/DC converting circuit 140 in FIG. 1 as illustrated in FIG. 4 or 5, the three-phase voltage type AC/DC converter 111 is provided with the three-phase AC filter circuit 145 (FIGS. 4 and 5), so that it is possible to remove the high-frequency component caused by the gate signal in the three-phase voltage type AC/DC converting unit 142 from the output from the three-phase voltage type AC/DC converting unit 142. Also, when the power is supplied from the DC voltage type to the AC terminal 122, by detecting the current or the voltage from the three-phase voltage type AC/DC converting unit 142 by the current detecting circuit 143 or the voltage detecting circuit 144 and generating the gate signal such that the difference between the PWM command and the output from the current detecting circuit 143 or the voltage detecting circuit 144 approaches zero by the gate signal generator 141, it is possible to control such that current error falls within an allowable range or to allow the output voltage to follow the PWM command. On the other hand, when the power is supplied from the distribution network to the DC terminal 121, by detecting the current or the voltage from the AC terminal 122 by the current detecting circuit 143 or the voltage detecting circuit 144 and generating the gate signal such that the difference between the PWM command and the output from the current detecting circuit 143 or the voltage detecting circuit 144 approaches zero by the gate signal generator 141, it is possible to control such that the current error falls within the allowable range or to allow the output voltage to follow the PWM command.

Figure 6:
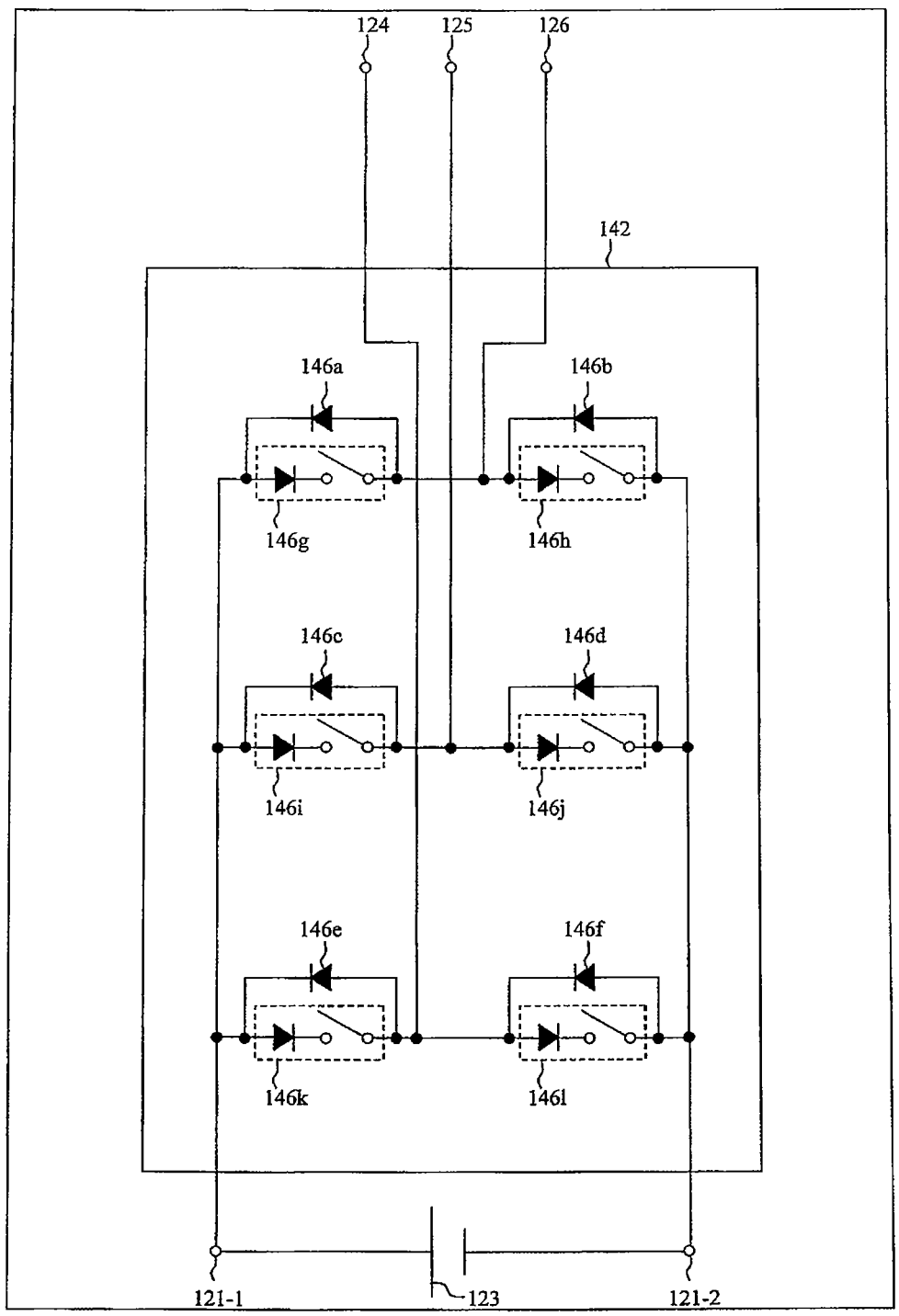
FIG. 6 is a schematic configuration diagram of a three-phase voltage type AC/DC converting unit of the three-phase voltage type AC/DC converter according to the present invention.

Herein, FIG. 6 is a schematic configuration diagram of the three-phase voltage type AC/DC converting unit in FIGS. 4 and 5. Also, FIG. 7 is a schematic configuration diagram of the three-phase AC filter circuit in FIGS. 4 and 5.

The three-phase voltage type AC/DC converting unit 142 illustrated in FIG. 6 is provided with six self-extinguishing switches 146g to 146l and six diodes 146a to 146f to compose a three-phase bridge. The self-extinguishing switches 146g to 146l are elements to switch on/off the switch according to on/off of an input signal and may exemplify a gate turn off thyristor (GTO) and an insulated gate bipolar transistor (IGBT). The three-phase voltage type AC/DC converting unit 142 may convert the power from the DC voltage type 123 to the three-phase AC power to output from three AC terminals 124, 125, and 126 by switching on/off the six switches by a pulse signal for each of the six self-extinguishing switches 146g to 146l according to a command from the gate signal generator 141 illustrated in FIG. 4 or 5. The output voltage may be changed by changing the pulse width modulation of the pulse signal. On the other hand, the three-phase voltage type AC/DC converting unit 142 may convert the power from the distribution network connected to the AC terminals 124, 125, and 126 to the DC power to output from DC terminals 121-1 and 121-2 by switching on/off the six switches by the pulse signal for each of the six self-extinguishing switches 146g to 146l according to the command from the gate signal generator 141 illustrated in FIG. 4 or 5. The output voltage may be changed by changing the pulse width modulation of the pulse signal. Meanwhile, in FIG. 6, the DC terminals 121-1 and 121-2 correspond to the DC terminal 121 in FIG. 1 being the schematic diagram.

Figure 7:
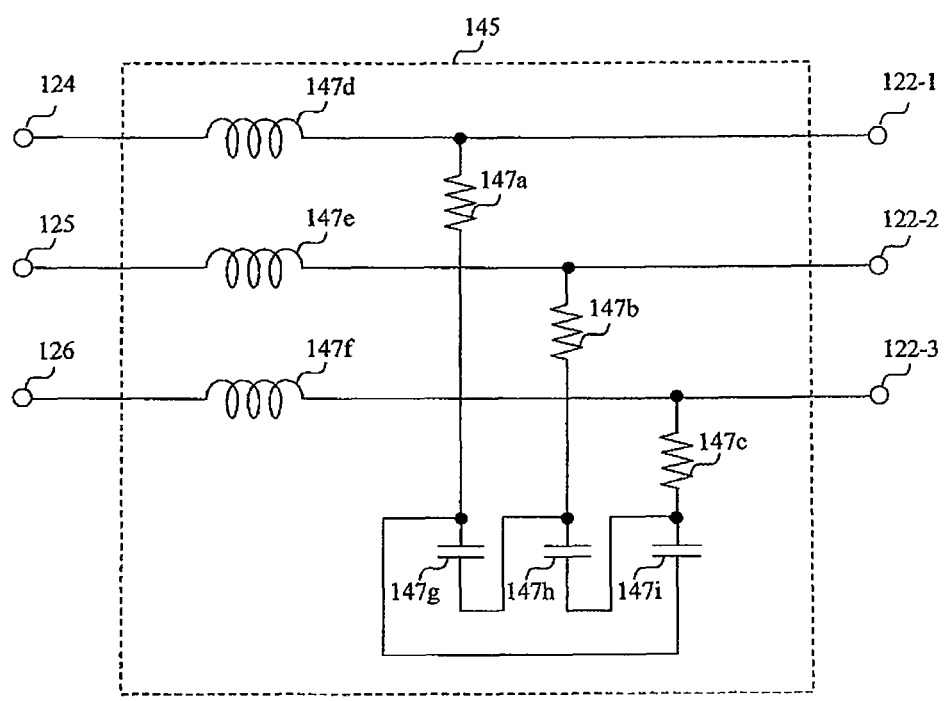
FIG. 7 is a schematic configuration diagram of a three-phase AC filter circuit of the three-phase voltage type AC/DC converter according to the present invention.

The three-phase AC filter circuit 145 illustrated in FIG. 7 has current control inductors 147d, 147e, and 147f for controlling the current in each phase, resistances 147a, 147b, and 147c connected between each phase, and capacitors 147g, 147h, and 147i between reception of the three-phase output from the three-phase voltage type AC/DC converting unit 142 in FIG. 4 or 5 by the AC terminals 124, 125, and 126 on an input side and output from the AC terminals 122-1, 122-2, and 122-3 on an output side. Capacity of each of the current control inductors 147d, 147e, and 147f, the resistances 147a, 147b, and 147c, and the capacitors 147g, 147h, and 147i may be appropriately determined according to frequency characteristics of an output signal from the AC terminals 122-1, 122-2, and 122-3 on the output side. Meanwhile, the resistances 147a, 147b, and 147c are not necessarily required. In the three-phase voltage type AC/DC converting circuits 140-1 and 140-2 in FIGS. 4 and 5, it is possible to remove the high-frequency component caused by the gate signal in the three-phase voltage type AC/DC converting unit 142 by applying the three-phase AC filter circuit 145 in FIG. 7 as the three-phase AC filter circuit 145. Meanwhile, in FIG. 7, the AC terminals 122-1, 122-2, and 122-3 correspond to the AC terminal 122 in FIG. 1 being the schematic diagram.

The UM converting circuit 131 in FIG. 1 converts the three-phase voltage at the AC terminal 122 on the dq rotational coordinate space of which d-axis component is a component related to amplitude of the three-phase voltage and of which q-axis component is a component related to frequency difference to output by following equations (1) to (3). In the equation (3), the three-phase voltage inputted to the UM converting circuit 131 is represented as (Va, Vb, Vc) and the output voltage vector (d-axis component, q-axis component) from the UM converting circuit 131 is represented as (Vd, Vq). In FIG. 1, the UM converting circuit 131 outputs to the frequency control circuit 150, the first lower level voltage control circuit 160, and the first upper level voltage control circuit 170. Herein, when carrying out operation of UM conversion by the equations (1) to (3), the three-phase voltage at the AC terminal 122 is detected. In this case, although it is possible to detect all the three phases of the three-phase voltage, since one remaining voltage is determined if any two voltages are determined in the three-phase voltage, it is also possible that the UM converting circuit 131 detects any two phases of the three-phase voltage. It is also possible to provide a low pass filter on a precedent stage of the UM converting circuit 131 to detect the three-phase voltage to the UM converting circuit 131 through the low pass filter. It is possible to remove the PWM component from the three-phase voltage to stabilize control of the three-phase voltage type AC/DC converter 111. It is also possible to provide the low pass filter on the subsequent stage of the UM converting circuit 131 to output the output voltage vector from the UM converting circuit 131 through the low pass filter. It is possible to remove the PWM component from the output voltage vector from the UM converting circuit 131 to stabilize the control of the three-phase voltage type AC/DC converter 111.

$$U \equiv \begin{pmatrix} \sin\theta_{dq} & -\cos\theta_{dq} \\ \cos\theta_{dq} & \sin\theta_{dq} \end{pmatrix} \qquad \text{[Equation 1]}$$

$$M \equiv \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \qquad \text{[Equation 2]}$$

$$\begin{pmatrix} V_d \\ V_q \end{pmatrix} \equiv UM \begin{pmatrix} V_a \\ V_b \\ V_c \end{pmatrix} \qquad \text{[Equation 3]}$$

$$= \sqrt{\frac{2}{3}} \begin{pmatrix} \sin\theta_{dq} & -\cos\theta_{dq} \\ \cos\theta_{dq} & \sin\theta_{dq} \end{pmatrix} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} V_a \\ V_b \\ V_c \end{pmatrix}$$

$$= \sqrt{\frac{2}{3}} \begin{pmatrix} \sin\theta_{dq} & \sin\left(\theta_{dq} - \frac{2}{3}\pi\right) & \sin\left(\theta_{dq} + \frac{2}{3}\pi\right) \\ \cos\theta_{dq} & \cos\left(\theta_{dq} - \frac{2}{3}\pi\right) & \cos\left(\theta_{dq} + \frac{2}{3}\pi\right) \end{pmatrix} \begin{pmatrix} V_a \\ V_b \\ V_c \end{pmatrix}$$

The frequency control circuit 150 synchronizes the generated value generated based on the reference frequency to define the frequency of the three-phase voltage at the AC terminal 122 and the q-axis component of the output voltage vector from the UM converting circuit 131 with the rotational angle of the rotational coordinate transformation matrix 152 in the UM converting circuit 131. Specifically, as illustrated in FIG. 2, the loop filter 153 adds a low pass element to the q-axis component being the component related to the frequency difference of the three-phase voltage and a second temporal integrator 155 performs temporal integration to the same to output. The low pass element added by the loop filter 153 may exemplify a delay element such as a primary delay element. According to this, a feedback loop may be stabilized.

Also, a generated value 157 generated by adding an integral value from the second temporal integrator 155 to an integral value obtained by performing the temporal integration to the reference frequency output from a reference frequency setting unit 151 by a first temporal integrator 154 by an adder 156 is synchronized with a rotational angle of the rotational coordinate transformation matrix 152 in the UM converting circuit 131. According to this, the rotational angle may be allowed to follow the frequency of the power system. For synchronizing, the generated value 157 obtained by adding the integral value from the first temporal integrator 154 and the integral value from the second temporal integrator 155 is set to θdq in the equation (3).

Herein, the UM converting circuit 131 outputs the component (q-axis component) related to the frequency difference of the three-phase voltage as described above. Therefore, a signal process in the UM converting circuit 131 is considered to correspond to a phase comparison process to compare phases of the three-phase voltage and the generated value 157 obtained by adding the integral value from the first temporal integrator 154 and the integral value from the second temporal integrator 155. Also, the signal process performed by adding the integral value from the first temporal integrator 154 and the integral value from the second temporal integrator 155 is considered to correspond to the signal process of a voltage controlled oscillator (VCO), which varies a value of the generated value according to the output voltage from the loop filter 153. Therefore, the UM converting circuit 131 and the frequency control circuit 150 are considered to perform operation as a PLL as a whole in which the generated value 157 obtained by adding the integral value from the first temporal integrator 154 and the integral value from the second temporal integrator 155 synchronizes with the frequency of the three-phase voltage at the AC terminal 122. Therefore, a frequency range in which synchronization is maintained (lock range) and a frequency pull-in range (capture range) may be obtained as in the case of the PLL.

The upper command vector 520 composed of a voltage amplitude command value and a frequency command value for the amplitude and the frequency of the three-phase voltage at the AC terminal 122 is inputted to the first upper level voltage control circuit 170 in FIG. 1. Then, based on the inputted upper command vector 520 and the output voltage vector from the UM converting circuit 131, the signal generated such that the amplitude and the frequency of the three-phase voltage at the AC terminal 122 approach the command values by the upper command vector 520 is output as the voltage command vector. Specifically, as illustrated in FIG. 2, a subtractor 171 subtracts an output vector from the UM converting circuit 131 and the upper command vector 520 and a first upper control amplifier 172 amplifies such that the amplitude and the frequency of the power system approach the command values by the upper command vector 520, thereby generating the voltage command value to output. According to this, even when the amplitude and the frequency of the power system change, deviation of the amplitude and the frequency of three-phase output power of the three-phase voltage type AC/DC converter 111 for the amplitude and the frequency may be detected respectively. Herein, the first upper control amplifier 172 may add the low pass element to the output vector from the subtractor 171. According to this, a feedback loop may be stabilized. It is also possible to further provide a limiter on the subsequent stage of the first upper control amplifier 172 and output the output vector from the first upper control amplifier 172 through the limiter. It is possible to prevent an excessive output to stabilize the control.

The first lower level voltage control circuit 160 in FIG. 1 outputs the signal generated such that the amplitude and the phase of the three-phase voltage approach a synthesized value of the reference voltage vector and the voltage command vector as the PWM command based on the reference voltage vector to define the amplitude and the phase of the three-phase voltage at the AC terminal 122, the output voltage vector from the UM converting circuit 131, and the voltage command vector from the first upper level voltage control circuit 170. Also, the reference voltage vector is set in advance by a first reference voltage vector setting unit 161. The reference voltage vector is two-phase and becomes a reference of the amplitude and the phase of the three-phase voltage at the AC terminal 122.

Specifically, as illustrated in FIG. 2, compensation of the deviation of the amplitude and the phase of the power system is added by adding the voltage command vector from the first upper level voltage control circuit 170 to the reference voltage vector set in advance by the first reference voltage vector setting unit 161 by the adder 162. Also, the subtractor 163 subtracts the output voltage vector from the UM converting circuit 131 and the first voltage controller 164 converts the difference from the amplitude and the phase of the power system so as to approach the synthesized value of the reference voltage vector and the voltage command vector to output. Further, a first inverted U converting unit 165 converts the output vector on the dq space from the first voltage controller 164 on an αβ space to output as the PWM command to the three-phase voltage type AC/DC converting circuit 140. According to this, the deviation detected by the first upper level voltage control circuit 170 is compensated and the amplitude and the phase of the three-phase voltage type AC/DC converter 111 may be controlled such that the amplitude and the phase of the three-phase output voltage of the three-phase voltage type AC/DC converter 111 when converting from the DC power to the AC power conform to the amplitude and the phase of the power system. On the other hand, the amplitude and the frequency of the three-phase alternating current at the AC terminal 122 when converting from the AC power to the DC power are detected to be compared with the amplitude and the frequency specified by the upper command vector 520. When the amplitude of the three-phase alternating current at the AC terminal 122 is small, reactive power is generated so as to increase the voltage at the AC terminal 122, and when the amplitude at the AC terminal 122 is large, the reactive power is decreased so as to decrease the voltage of the three-phase alternating current at the AC terminal 122. Also, when the frequency of the three-phase alternating current at the AC terminal 122 is small, the power output from the DC terminal 121 is decreased, and when the frequency of the three-phase alternating current at the AC terminal 122 is large, the power output from the DC terminal 121 is increased.

Also, as a result of the control to "approach the upper command vector 520", the three-phase voltage type AC/DC converter 111 operates as follows. When the frequency at the AC terminal 122 is larger than the frequency command value of the upper command vector 520, the three-phase voltage type AC/DC converter 111 converts the alternating current from the AC terminal 122 to the direct current to supply the DC power from the DC terminal 121. The DC power to be supplied has magnitude corresponding to the difference between the frequency at the AC terminal 122 and the frequency command value of the upper command vector 520.

On the other hand, the three-phase voltage type AC/DC converter 111 converts the direct current from the DC terminal 121 to the alternating current and supplies the AC power to the AC terminal 122 when the frequency at the AC terminal 122 is smaller than the frequency command value of the upper command vector 520. The AC power to be supplied has the magnitude corresponding to the difference between the frequency at the AC terminal 122 and the frequency command value of the upper command vector 520.

Also, when the voltage at the AC terminal 122 is larger than the voltage command value of the upper command vector 520, the three-phase voltage type AC/DC converter 111 decreases the reactive power of itself, and when the voltage at the AC terminal 122 is smaller than the voltage command value of the upper command vector 520, the three-phase voltage type AC/DC converter 111 increases the reactive power of itself. The reactive power has the magnitude corresponding to the difference between the voltage at the AC terminal 122 and the voltage command value of the upper command vector 520.

An amplifier may be applied as the first voltage controller 164, for example. Herein, it is also possible to further provide the low pass filter between the subtractor 163 and the first voltage controller 164 and output the output vector from the subtractor 163 through the low pass filter. It is possible to remove the PWM component to stabilize the control by the first voltage controller 164. It is also possible to further provide a voltage limiter between the subtractor 163 and the first voltage controller 164 (when the low pass filter is provided on this position, between the low pass filter and the first voltage controller 164) to output the output vector from the subtractor 163 through the voltage limiter. It is possible to inhibit transient variation of the output voltage at the time of activation of the three-phase voltage type AC/DC converter 111. It is also possible to further provide a current limiter between the first voltage controller 164 and the first inverted U converting unit 165 (when a filter current compensating unit, a PWM current deviation compensating unit, and a feedforward amplifier to be described later are provided, between an adder for adding the outputs of them and the first inverted U converting unit 165) to output the output vector from the first voltage controller 164 through the current limiter. It is possible to prevent the excessive current, which flows to a switching device of the three-phase voltage type AC/DC converter 111, both at normal time and at transient time.

Figure 3:
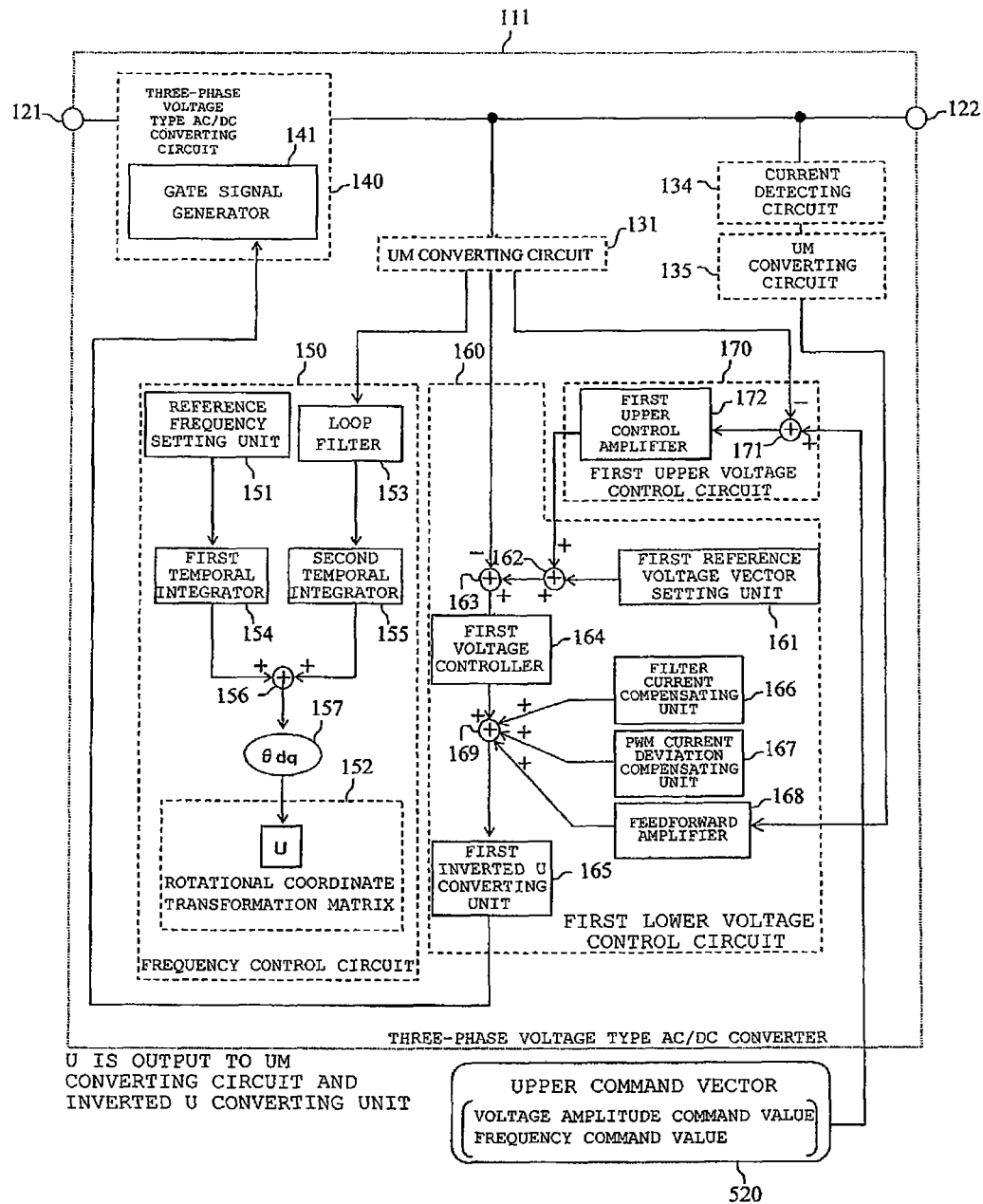
FIG. 3 is a schematic configuration diagram of the three-phase voltage type AC/DC converter according to the present invention.

FIG. 3 is a schematic configuration diagram of the three-phase voltage type AC/DC converter according to another embodiment.

The three-phase voltage type AC/DC converter 111 in FIG. 3 has a mode obtained by further providing a current detecting circuit 134 for detecting the three-phase output current at the AC terminal 122 and a UM converting circuit 135 for converting a detection current signal of the current detecting circuit 134 on the dq rotational coordinate space to output in the three-phase voltage type AC/DC converter 111 illustrated in FIG. 2 in which the output vectors from a filter current compensating unit 166, a PWM current deviation compensating unit 167, and a feedforward amplifier 168 are added to the output vector from the first voltage controller 164 by the adder 169. In this case, any of the three-phase voltage type AC/DC converting circuits 140-1 and 140-2 illustrated in FIGS. 4 and 5 may be applied as the three-phase voltage type AC/DC converting circuit 140. Therefore, in FIG. 3, any of the three-phase voltage type AC/DC converting circuits 140-1 and 140-2 in FIGS. 4 and 5 is applied. Also, the dq conversion in the UM converting circuit 135 is similar to the coordinate conversion described by the equations (1) to (3). That is to say, the UM converting circuit 135 outputs the detection current signal of the current detecting circuit 134 such that the component related to the active power of the detection current signal is set to the d-axis component and the component related to the reactive power is set to the q-axis component.

The filter current compensating unit 166 outputs a current compensation vector defined to compensate current loss in the three-phase AC filter circuit 145 (FIG. 4 or 5) in the three-phase voltage type AC/DC converting circuit 140. According to this, the three-phase voltage type AC/DC converter 111 may compensate the loss by setting the current loss in the three-phase AC filter circuit 145 in FIG. 4 or 5 by the filter current compensating unit 166 in advance and adding the same to the output vector from the first voltage controller 164. Also, the PWM current deviation compensating unit 167 outputs a current deviation compensation vector defined to compensate the current deviation of the three-phase output current from the three-phase voltage type AC/DC converting circuit 140. According to this, the three-phase voltage type AC/DC converter 111 may compensate the loss by setting the current deviation in the three-phase voltage type AC/DC converting circuit 140 when the PWM command is set to zero command in advance by the PWM current deviation compensating unit 167 and adding the same to the output vector from the first voltage controller 164. Also, the feedforward amplifier 168 amplifies the output current vector from the UM converting circuit 135 with a predetermined feedforward gain so as to compensate the current, which flows through the AC terminal 122, to output. According to this, the three-phase voltage type AC/DC converter 111 detects active/reactive components of the three-phase output current by detecting the three-phase output current at the AC terminal 122 by the current detecting circuit 134 to dq convert and adds the values to the output vector from the first voltage controller 164 through the feedforward amplifier 168, thereby generating a stable output voltage even when a load current changes.

Herein, voltage control characteristics when applying the three-phase voltage type AC/DC converting circuit in FIG. 4 to the three-phase voltage type AC/DC converter illustrated in FIG. 3 is described.

A gain as a current amplifier in the three-phase voltage type AC/DC converting unit 142 in FIG. 4 is set to $G_{PWM}$ and the current deviation of the three-phase output current from the three-phase voltage type AC/DC converting unit 142 for the zero command vector is set to $-G_{PWM}M_1[D]$ ([ ] is intended to mean vector in the description, this is similar in a following description). Herein, $M_1$ is represented by a following equation (4) in the transformation matrix from the αβ space to a three-phase component.

$$M_1 \equiv \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \qquad \text{[Equation 4]}$$

A value $-G_{PWM}M_1[D]$ is an inherent value generated by feeding back the signal output according to the magnitude of the current detected by the current detecting circuit 143 to the gate signal generator 141. Also, the three-phase current, which flows through the three-phase AC filter circuit 145, is set to $[i_p]$. In this case, current compensation in the PWM current deviation compensating unit 167 in FIG. 3 is U[D]. Also, in FIG. 3, the first voltage controller 164 is made to be the amplifier and a feedback gain of the amplifier is set to a and a feedforward gain in the feedforward amplifier 168 is set to β. Also, the upper command vector 520 is set to [$V_{mu}$] and the gain of the first upper control amplifier 172 is set to κ. The three-phase output current and the three-phase output voltage at the AC terminal 122 are set to [$i_s$] and [V], respectively. Also, the reference voltage vector in the first reference voltage vector setting unit 161 is set to [$V_c$]. Meanwhile, the current loss in the three-phase AC filter circuit 145 in FIG. 4 is set to zero, and the impedance of the three-phase AC filter circuit 145 is set to $Z_F$. Under the above-described assumption, the PWM command [j] from the first lower level voltage control circuit 160 in FIG. 3 may be delivered as follows.

$$\vec{j} = U^{-1}\left(\alpha\left(\kappa(\vec{V}_{mu} - UM\vec{V}) + \vec{V}_c - UM\vec{V}\right) + \beta UM\vec{i}_s + U\vec{D}\right) \quad \text{[Equation 5]}$$

$$\vec{i}_p = G_{PWM}M_1(\vec{j} - \vec{D})$$

$$\vec{i}_p = \vec{i}_s + \frac{\vec{V}}{Z_F}$$

wherein, correspondence relationship with the description is $$\vec{j} = [j]$$

$$\vec{V}_{mu} = [V_{mu}], \vec{V} = [V], V_c = [V_c]$$

$$\vec{i}_s = [i_s], \vec{i}_p = [i_p]$$

$$\vec{D} = [D]$$

A following equation may be derived regarding the three-phase output voltage V from the above-described equation (5).

$$\vec{V} = \frac{\alpha G_{PWM} M_1 U^{-1}(\kappa \vec{V}_{mu} + \vec{V}_c)}{\alpha(\kappa+1)G_{PWM} + \frac{1}{Z_F}} - \frac{1 - \beta G_{PWM}}{\alpha(\kappa+1)G_{PWM} + \frac{1}{Z_F}} \vec{i}_s \quad \text{[Equation 6]}$$

From the above-described equation (6), the internal equivalent impedance of the three-phase voltage type AC/DC converting circuit 140-1 illustrated in FIG. 4 may be represented by a following equation (7). That is to say, by the control parameters α, β, and κ in the three-phase voltage type AC/DC converter 111 in FIG. 3, it is possible to allow the three-phase voltage type AC/DC converting unit 142 of the three-phase voltage type AC/DC converting circuit 140-1 to have the internal equivalent impedance.

$$\frac{1 - \beta G_{PWM}}{\alpha(\kappa+1)G_{PWM} + \frac{1}{Z_F}} [\Omega] \quad \text{[Equation 7]}$$

As described above, since the three-phase voltage type AC/DC converter 111 in FIGS. 1 to 3 has the internal equivalent impedance, this may be connected to the power system as the voltage type to be operated, and since this is provided with a frequency setting circuit, the first upper level voltage control circuit, and the first lower level voltage control circuit, autonomous parallel operation to autonomously compensate power deviation for the power system is possible. Therefore, reliability of the device is improved and dispersed arrangement becomes possible. Further, when a plurality of devices are operated in parallel, it is possible to operate them without limitation in the number of devices. Further, since the three-phase voltage type AC/DC converter 111 has governor-free characteristics, this may increase or decrease the DC power output from the DC terminal 121 according to the frequency of the power distribution network. Also, since the three-phase voltage type AC/DC converter 111 has voltage-maintaining characteristics, this may increase or decrease the reactive power so as to maintain the DC voltage output from the DC terminal 121 constant according to the voltage of the power system network.

(Second Embodiment)

Figure 8:
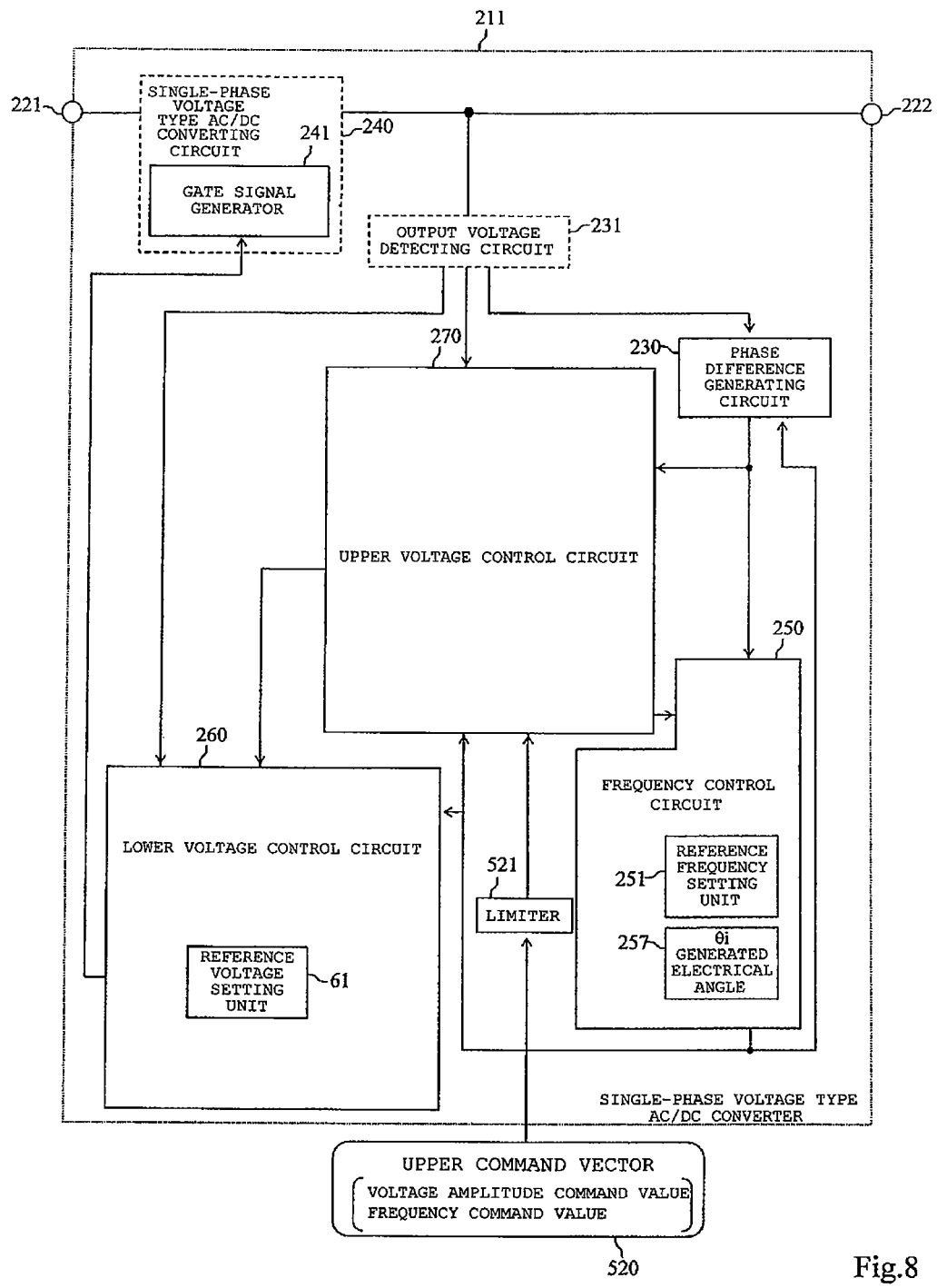
FIG. 8 is a schematic configuration diagram of a single-phase voltage type AC/DC converter according to the present invention.
Figure 9:
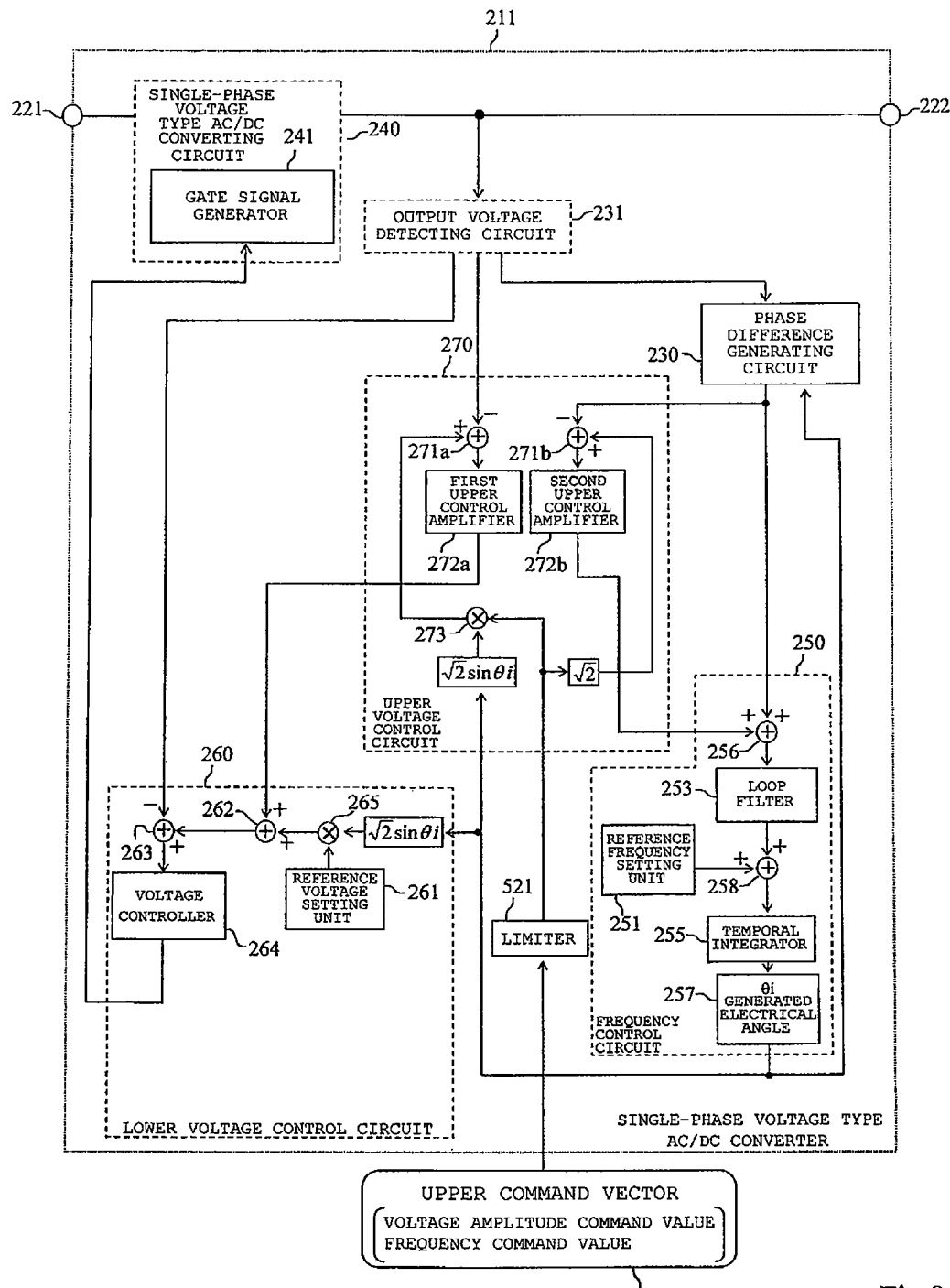
FIG. 9 is a schematic configuration diagram of the single-phase voltage type AC/DC converter according to the present invention.

FIGS. 8 and 9 are schematic configuration diagrams of a single-phase voltage type AC/DC converter according to this embodiment.

A single-phase voltage type AC/DC converter 211 illustrated in FIG. 8 is provided with a single-phase voltage type AC/DC converting circuit 240, which has the internal equivalent impedance as seen from an AC terminal 222, for converting the power from the DC voltage type connected to a DC terminal 221 to single-phase AC power to output from the AC terminal 222 or converting the single-phase AC power from a single-phase AC source connected to the AC terminal 222 to the DC power to output from the DC terminal 221 according to the pulse width modulation of the gate signal generated based on the PWM command, a phase difference generating circuit 230, which has a phase delay single-phase AC generator for generating a delay single-phase alternating current obtained by delaying a phase of the single-phase alternating current at the AC terminal 222, for generating a phase difference voltage corresponding to phase difference between the single-phase AC voltage at the AC terminal 222 and an internal electromotive voltage of the single-phase voltage type AC/DC converting circuit 240 based on the delay single-phase alternating current, an upper level voltage control circuit 270 to which an upper command vector 520 composed of the voltage amplitude command value and the frequency command value for the amplitude and the frequency of the single-phase alternating current at the AC terminal 222 is inputted for outputting a voltage command signal and a frequency command signal generated such that the amplitude and the frequency of the single-phase alternating current at the AC terminal 222 approach the command values by the upper command vector 520 based on the inputted upper command vector 520, the phase difference voltage from the phase difference generating circuit 230, and the single-phase AC output at the AC terminal 222, a frequency control circuit 250 for generating a generated electrical angle based on the reference frequency to define the frequency of the single-phase alternating current at the AC terminal 222, the frequency command signal from the upper level voltage control circuit 270, and the phase difference voltage from the phase difference generating circuit 230 to synchronize an electrical angle of the internal electromotive voltage of the single-phase voltage type AC/DC converting circuit 240 with the generated electrical angle, and a lower level voltage control circuit 260 for outputting the signal generated such that the amplitude, the frequency, and the phase of the single-phase output voltage approach the synthesized value of the reference voltage to define the amplitude of the single-phase alternating current at the AC terminal 222, the voltage command signal, and the generated value as the PWM command based on the single-phase AC voltage at the AC terminal 222, the generated value from the frequency control circuit 250, and the voltage command signal from the upper level voltage control circuit 270.

The single-phase voltage type AC/DC converting circuit 240 converts the power from the single-phase AC source not illustrated to the DC power according to the pulse width modulation of the gate signal generated by a gate signal generator 241 based on the PWM command. The single-phase AC source may exemplify the distribution network, for example. Also, the single-phase voltage type AC/DC converting circuit 240 converts the power from the DC voltage type not illustrated to the single-phase AC power according to the pulse width modulation of the gate signal generated by the gate signal generator 241 based on the PWM command. The DC voltage type may exemplify the voltage type for independently outputting the DC voltage such as the battery, the voltage type for generating the power by the method of generating power such as the wind generation and rectifying to output the DC voltage, or the voltage type for controlling the voltage of the DC capacitor to output the DC voltage. In this case, it is possible to further provide the blocking inductor between the connection point of an output voltage detecting circuit 231 and the AC terminal 222 for outputting the single-phase alternating current from the AC terminal 222 through the blocking inductor. It is possible to prevent the outflow of the PWM component in the single-phase voltage type AC/DC converting circuit 240 to the AC terminal 222.

Figure 11:
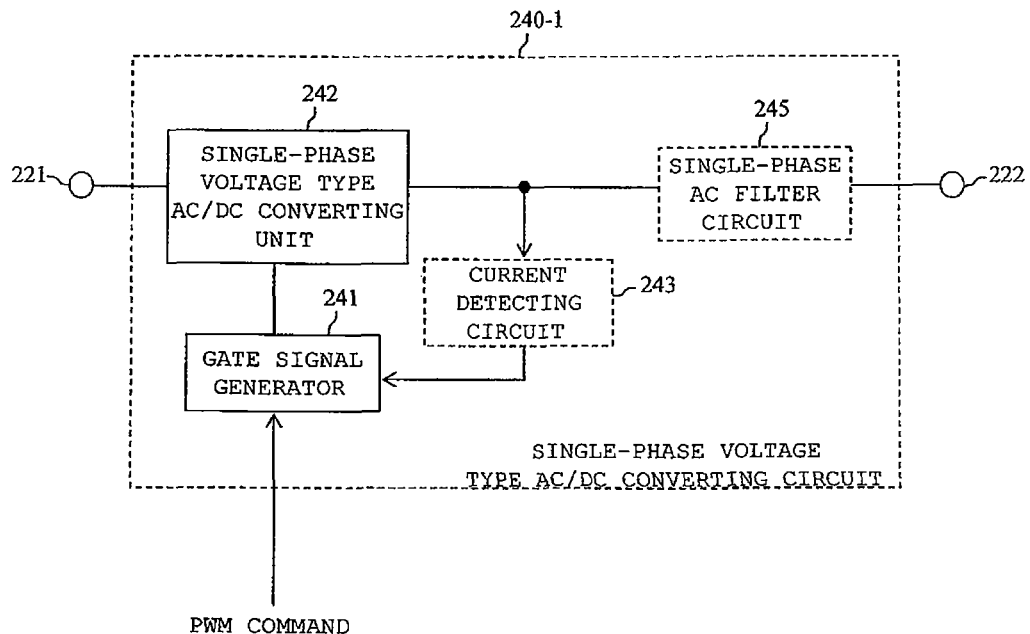
FIG. 11 is a schematic configuration diagram of a single-phase voltage type AC/DC converting circuit of the single-phase voltage type AC/DC converter according to the present invention.
Figure 12:
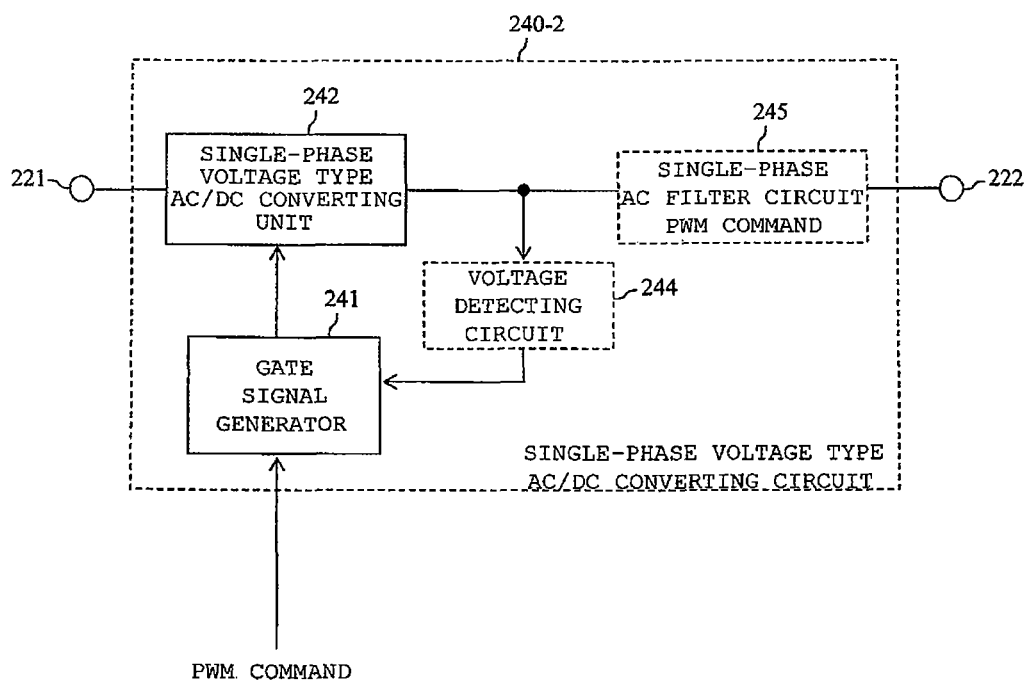
FIG. 12 is a schematic configuration diagram of the single-phase voltage type AC/DC converting circuit of the single-phase voltage type AC/DC converter according to the present invention.

FIGS. 11 and 12 are schematic configuration diagrams of the single-phase voltage type AC/DC converting circuit.

A single-phase voltage type AC/DC converting circuit 240-1 illustrated in FIG. 11 is provided with a single-phase voltage type AC/DC converting unit 242, which has the internal equivalent impedance as seen from the AC terminal 222, for receiving the power from the DC voltage type by the DC terminal 221 and converting the same to the single-phase AC power to output from the AC terminal 222 according to the pulse width modulation of the generated gate signal or converting the power from the distribution network connected to the AC terminal 222 to the DC power to output from the DC terminal 221 according to the pulse width modulation of the gate signal, a current detecting circuit 243 for detecting a single-phase AC output current from the single-phase voltage type AC/DC converting unit 242 or a single-phase input current from the AC terminal 222 to output the signal generated according to the magnitude of the single-phase AC output current or the single-phase input current, a gate signal generator 241 for generating the gate signal such that the difference between the PWM command and the output from the current detecting circuit 243 approaches zero to output, and a single-phase AC filter circuit 245 for removing the high-frequency component caused by the gate signal in the single-phase voltage type AC/DC converting unit 242 from the single-phase alternating current of the single-phase voltage type AC/DC converting unit 242 to output.

Also, a single-phase voltage type AC/DC converting circuit 240-2 illustrated in FIG. 12 is provided with a voltage detecting circuit 244 for detecting a single-phase AC output voltage from the single-phase voltage type AC/DC converting unit 242 or a single-phase input voltage from the AC terminal 222 to output the signal generated according to the magnitude of the voltage in place of the current detecting circuit 243 in FIG. 11. In this case, the gate signal generator 241 generates the gate signal such that the difference between the PWM command and the output from the voltage detecting circuit 244 approaches zero to output.

It is possible to allow the single-phase voltage type AC/DC converting unit 242 illustrated in FIGS. 11 and 12 to have the internal equivalent impedance by the control variable in the single-phase voltage type AC/DC converter 211 in FIG. 8 as described later or by connecting a resistance, a reactor, and a single-phase transformer or a combination of them on a side of the AC terminal 222 of the single-phase voltage type AC/DC converting circuits 240-1 and 240-2 in FIGS. 11 and 12. For example, it is possible to connect the resistance or the reactor in series on the side of the AC terminal 222 of the single-phase voltage type AC/DC converting circuits 240-1 and 240-2, or when the resistance is further connected, the reactor may be connected in series on the subsequent stage of the resistance. Also, it is possible to connect the single-phase transformer on the side of the AC terminal 222 of the single-phase voltage type AC/DC converting circuits 240-1 and 240-2. Also, when the reactor is connected on the side of the AC terminal 222 of the single-phase voltage type AC/DC converting circuits 240-1 and 240-2, the single-phase transformer may be connected on the subsequent stage of the reactor. Further, when the resistance is connected on the side of the AC terminal 222 of the single-phase voltage type AC/DC converting circuits 240-1 and 240-2 and the reactor is connected in series on the subsequent stage of the resistance, the single-phase transformer may be connected on the subsequent stage of the reactor. In this manner, the single-phase voltage type AC/DC converting circuit 240 has the internal equivalent impedance, and according to this, the single-phase voltage type AC/DC converter 211 in FIG. 8 may be connected to the power system as the voltage type or the load.

By configuring the single-phase voltage type AC/DC converting circuit 240 in FIG. 8 as illustrated in FIG. 11 or 12, the single-phase voltage type AC/DC converter 211 is provided with the single-phase AC filter circuit 245 (FIGS. 11 and 12), so that it is possible to remove the high-frequency component caused by the gate signal in the single-phase voltage type AC/DC converting unit 242 from the output from the single-phase voltage type AC/DC converting unit 242. Also, when the power is supplied from the DC voltage type to the AC terminal 222, it is possible to control such that the current error falls within the allowable range or to allow the output voltage to follow the PWM command by detecting the current or the voltage from the single-phase voltage type AC/DC converting unit 242 by the current detecting circuit 243 or the voltage detecting circuit 244 and generating the gate signal such that the difference between the PWM command and the output from the current detecting circuit 243 or the voltage detecting circuit 244 approaches zero by the gate signal generator 241. On the other hand, when the power is supplied from the distribution network to the DC terminal 221, it is possible to control such that the current error falls within the allowable range or to allow the output voltage to follow the PWM command by detecting the current or the voltage from the AC terminal 222 by the current detecting circuit 243 or the voltage detecting circuit 244 and generating the gate signal such that the difference between the PWM command and the output from the current detecting circuit 243 or the voltage detecting circuit 244 approaches zero by the gate signal generator 241.

Figure 13:
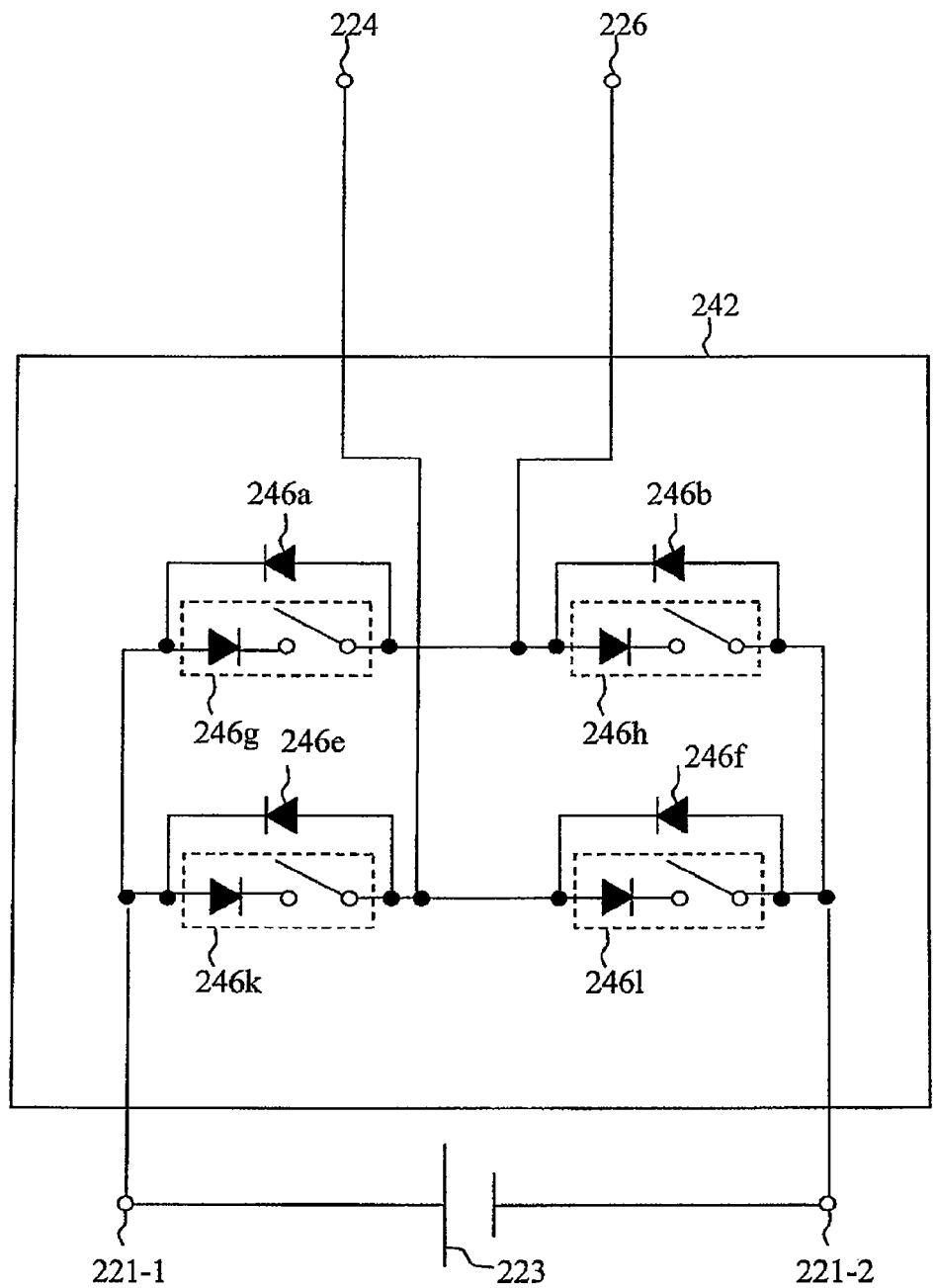
FIG. 13 is a schematic configuration diagram of a single-phase voltage type AC/DC converting unit of the single-phase voltage type AC/DC converter according to the present invention.

Herein, FIG. 13 is a schematic configuration diagram of the single-phase voltage type AC/DC converting unit in FIGS. 11 and 12. Also, FIG. 14 is a schematic configuration diagram of the single-phase AC filter circuit in FIGS. 11 and 12.

The single-phase voltage type AC/DC converting unit 242 illustrated in FIG. 13 is provided with four self-extinguishing switches 246$g$, 246$h$, 246$k$, and 246$l$ and four diodes 246$a$, 246$b$, 246$e$, and 246$f$. The self-extinguishing switches 246$g$, 246$h$, 246$k$, and 246$l$ are the elements to switch on/off the switch according to on/off of the input signal and may exemplify a MOS field-effect transistor (MOSFET) and an insulated gate bipolar transistor (IGBT). The gate signal is inputted from the gate signal generator 241 illustrated in FIG. 11 or 12 to the single-phase voltage type AC/DC converting unit 242 as the inputted signal. The single-phase voltage type AC/DC converting unit 242 may convert the power from the DC voltage type 223 to the single-phase AC power to output from AC terminals 224 and 226 by switching on/off the four switches by the pulse signal for each of the four self-extinguishing switches 246g, 246h, 246k, and 246l according to the gate signal. The output voltage may be changed by changing the pulse width modulation of the pulse signal. On the other hand, the single-phase voltage type AC/DC converting unit 242 may convert the power from the distribution network connected to the AC terminals 224 and 226 to the DC power to output from DC terminals 221-1 and 221-2 by switching on/off the four switches by the pulse signal for each of the four self-extinguishing switches 246g, 246h, 246k and 246l according to the command from the gate signal generator 241 illustrated in FIG. 11 or FIG. 12. The output voltage may be changed by changing the pulse width modulation of the pulse signal. Meanwhile, in FIG. 13, the DC terminals 221-1 and 221-2 correspond to the DC terminal 221 in FIG. 8 being the schematic diagram.

Figure 14:
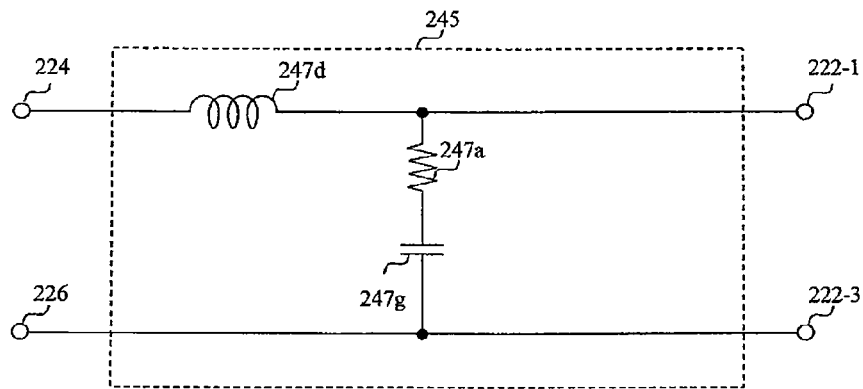
FIG. 14 is a schematic configuration diagram of a single-phase AC filter circuit of the single-phase voltage type AC/DC converter according to the present invention.

The single-phase AC filter circuit 245 illustrated in FIG. 14 has an inductor 247d for controlling the current, a resistance 247a connected between the AC terminals 222-1 and 222-3, and a capacitor 247g between the reception of the single-phase output from the single-phase voltage type AC/DC converting unit 242 in FIG. 11 or FIG. 12 by the AC terminals 224 and 226 on the inputted side and the output from the AC terminals 222-1 and 222-3 on the output side. Each capacity of the inductor 247d, the resistance 247a, and the capacitor 247g may be appropriately determined according to the frequency characteristics of the output signal from the AC terminals 222-1 and 222-3 on the output side. Meanwhile, it is possible to remove the resistance 247a and connect the capacitor 247g between the AC terminals 222-1 and 222-3. In the single-phase voltage type AC/DC converting circuits 240-1 and 240-2 in FIGS. 11 and 12, it is possible to apply the single-phase AC filter circuit 245 in FIG. 14 as the single-phase AC filter circuit 245 to remove the high-frequency component caused by the gate signal in the single-phase voltage type AC/DC converting unit 242. Meanwhile, in FIG. 14, the AC terminals 222-1 and 222-3 correspond to the AC terminal 222 in FIG. 8 being the schematic diagram.

The output voltage detecting circuit 231 in FIG. 8 detects the single-phase AC voltage at the AC terminal 222 to output to the phase difference generating circuit 230, the lower level voltage control circuit 260, and the upper level voltage control circuit 270. It is also possible to provide the low pass filter on the precedent stage of the output voltage detecting circuit 231 to detect the single-phase AC voltage to the output voltage detecting circuit 231 through the low pass filter. It is possible to remove the PWM component from the single-phase AC voltage to stabilize the control of the single-phase voltage type AC/DC converter 211. It is also possible to provide the low pass filter on the subsequent stage of the output voltage detecting circuit 231 to output the output voltage from the output voltage detecting circuit 231 through the low pass filter. It is possible to remove the PWM component from the output voltage from the output voltage detecting circuit 231 to stabilize the control of the single-phase voltage type AC/DC converter 211.

Figure 15:
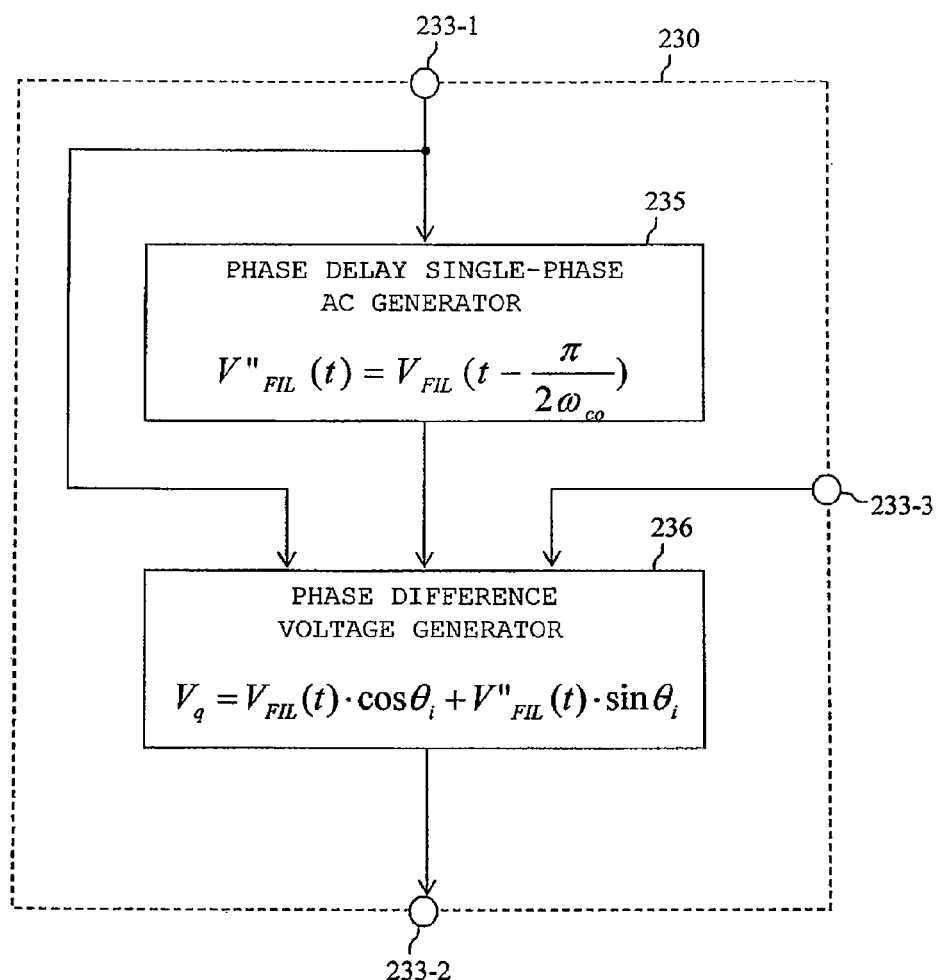
FIG. 15 is a schematic configuration diagram of a phase difference generating circuit of the single-phase voltage type AC/DC converter according to the present invention.

The phase difference generating circuit 230 in FIG. 8 generates the phase difference voltage corresponding to the phase difference between a single-phase AC voltage $V_{FIL}(t)$ at the AC terminal 222 and the internal electromotive voltage of the single-phase voltage type AC/DC converting circuit 240. FIG. 15 is an example of the schematic configuration diagram of the phase difference generating circuit 230. The phase difference generating circuit 230 has a phase delay single-phase AC generator 235 for generating the delay single-phase alternating current obtained by delaying a predetermined phase from the single-phase alternating current inputted from the terminal 233-1, a phase difference voltage generator 236 for generating the phase difference voltage from the single-phase AC voltage inputted from a terminal 233-1, the voltage of the delay single-phase alternating current from the phase delay single-phase AC generator 235, and a value inputted from a terminal 233-3, and a terminal 233-2 for outputting the phase difference voltage. Although the phase delay single-phase AC generator 235 delays the phase of the delay single-phase alternating current by substantially 90 degrees in FIG. 15, the phase delay may be any angle other than 0 degree and 180 degrees.

The single-phase AC voltage $V_{FIL}(t)$ detected by the output voltage detecting circuit 231 is inputted to the terminal 233-1. A generated electrical angle 257 generated by the frequency control circuit 250 to be described later is inputted to the terminal 233-3. The single-phase AC voltage $V_{FIL}(t)$ at the AC terminal 222 may be represented by an equation 8.

$$V_{FIL}(t) = \sqrt{2} E_s \cdot \sin(\omega_s t + \theta_s) \; [V] \qquad \text{[Equation 8]}$$

Herein, $\omega_s$ is an angular frequency [rad/s], $\theta_s$ is a phase angle [rad], and $E_s$ is an effective value [V]. Meanwhile, a reference of the phase angle is the internal electromotive voltage.

When the angular frequency $\omega_s$ of the single-phase alternating current at the AC terminal 222 and a reference angular frequency $\omega_{co}$ of the single-phase voltage type AC/DC converting circuit 240 are equal to each other, the phase difference between the single-phase AC voltage $V_{FIL}(t)$ and a phase delay single-phase AC voltage $V''_{FIL}(t)$ is 90 degrees and the phase delay single-phase AC voltage $V''_{FIL}(t)$ generated by the phase delay single-phase AC generator 235 may be represented by an equation 9.

$$V''_{FIL}(t) = V_{FIL}\left(t - \frac{\pi}{2\omega_{co}}\right) = \sqrt{2} E_s \cdot \sin\left(\omega_s t + \theta_s - \frac{\pi \omega_s}{2\omega_{co}}\right) \qquad \text{[Equation 9]}$$
$$= -\sqrt{2} E_s \cdot \cos(\omega_s t + \theta_s)$$

The phase difference voltage generator 236 outputs a phase difference voltage $V_q(t)$ from the single-phase AC voltage $V_{FIL}(t)$, the phase delay single-phase AC voltage $V''_{FIL}(t)$, and the generated value generated by the frequency control circuit 250. The phase difference voltage $V_q(t)$ is represented by an equation 10.

$$V_q(t) = V_{FIL}(t) \cdot \cos\theta_i + V''_{FIL}(t) \cdot \sin\theta_i \qquad \text{[Equation 10]}$$
$$= \sqrt{2} E_s \{\sin(\omega_s t + \theta_s - \theta_i) +$$
$$\frac{\pi(\omega_{co} - \omega_s)}{2\omega_{co}} \sin(\omega_s t + \theta_s) \sin\theta_i\}$$
$$= \sqrt{2} E_s \cdot \sin(\omega_s t + \theta_s - \theta_i)$$

When an angular speed of $\theta_i$ equals to $\omega_s$, the equation 10 becomes a constant number. Since $\theta_s$ is the phase difference between voltages at both ends of the internal equivalent impedance, this is generally small. Therefore, $V_q(t)$ may be approximated as represented by an equation 11.

$$V_q(t) = \sqrt{2} E_s \cdot \theta_s \qquad \text{[Equation 11]}$$

The phase difference generating circuit 230 outputs the generated phase difference voltage to the frequency control circuit 250 and the upper level voltage control circuit 270.

Meanwhile, although only a case in which $\omega_s$ equals to $\omega_{co}$ is herein illustrated, when they are not equal to each other, a similar approximate solution may be obtained and there is no practical problem.

The frequency control circuit 250 determines the electrical angle of the internal electromotive voltage of the single-phase voltage type AC/DC converting circuit 240 based on the reference frequency, which defines the frequency of the single-phase alternating current at the AC terminal 222, the frequency command signal from the upper level voltage control circuit 270, and the output signal from the phase difference generating circuit 230. Specifically, as illustrated in FIG. 9, a second adder 256 adds the frequency command signal from the upper level voltage control circuit 270 and the phase difference voltage from the phase difference generating circuit 230. The loop filter 253 filters a low pass component being the component related to the frequency difference of the single-phase alternating current to the frequency component of the signal output by the second adder 256. The low pass element added by the loop filter 253 is the delay element such as the primary delay element, for example. According to this, the feedback loop may be stabilized.

Also, a third adder 258 adds the reference frequency output from a reference frequency setting unit 251 and an output value of the loop filter 253. A temporal integrator 255 performs the temporal integration to the output from the third adder 258. The generated electrical angle 257 with an inherent angle $\theta_i$ may be obtained by the temporal integration to the output from the third adder 258 performed by the temporal integrator 255.

The generated electrical angle 257 becomes the electrical angle of the internal electromotive voltage of the single-phase voltage type AC/DC converting circuit 240 by a second multiplier 265 of the lower level voltage control circuit 260. According to this, it is possible to allow the rotational angle to follow the frequency of the power system.

Herein, the phase difference generating circuit 230 outputs the phase difference voltage corresponding to the phase difference between the single-phase AC voltage at the AC terminal 222 and the internal electromotive voltage of the single-phase voltage type AC/DC converting circuit 240 as described above. Therefore, the signal process in the phase difference generating circuit 230 is considered to correspond to the phase comparison process to compare the phases of the single-phase alternating current and the generated electrical angle 257 from the frequency control circuit 250. Also, the signal process to add the reference frequency from the reference frequency setting unit 251 and the output value from the loop filter 253 to integrate is considered to correspond to the signal process of the voltage controlled oscillator (VCO), which varies a value of the generated electrical angle 257 according to the output voltage from the loop filter 253. Therefore, the phase difference generating circuit 230 and the frequency control circuit 250 are considered to perform the operation as the PLL as a whole in which the generated electrical angle 257 synchronizes with the frequency of the single-phase alternating current at the AC terminal 222.

The upper command vector 520 composed of the voltage amplitude command value and the frequency command value for the amplitude and the frequency of the single-phase alternating current at the AC terminal 222 is inputted to the upper level voltage control circuit 270 in FIG. 8, and the upper level voltage control circuit 270 outputs the voltage command signal and the frequency command signal generated such that the amplitude and the frequency of the single-phase alternating current at the AC terminal 222 approach the command values by the upper command vector 520 based on the generated electrical angle 257 from the frequency control circuit 250, the phase difference voltage from the phase difference generating circuit 230, and the single-phase alternating current at the AC terminal 222. It is possible to input the upper command vector 520 to the upper level voltage control circuit 270 not directly but through a limiter 521, which determines an upper limit and a lower limit of the upper command vector 520. Specifically, as illustrated in FIG. 9, a first multiplier 273 multiplies a value obtained by multiplying $\sqrt{2}$ by a sine value of the generated electrical angle 257 from the frequency control circuit 250 by the voltage amplitude command value of the upper command vector 520. A first subtractor 271$a$ subtracts the AC output voltage at the AC terminal 222 from the signal from the first multiplier 273. A first upper control amplifier 272$a$ amplifies the signal from the first subtractor 271$a$ to output as the voltage command signal such that the single-phase alternating current at the AC terminal 222 approaches the command value by the upper command vector 520. Also, a second subtractor 271$b$ subtracts the phase difference voltage from the phase difference generating circuit 230 from a value obtained by multiplying $\sqrt{2}$ by the frequency command value of the upper command vector 520. A second upper control amplifier 272$b$ amplifies the signal from the second subtractor 271$b$ to output as the frequency command signal such that the frequency of the single-phase alternating current at the AC terminal 222 approaches the command value by the upper command vector 520.

According to this, even when the amplitude and the frequency of the power system change, the error of the amplitude and of the frequency of the single-phase output power of the single-phase voltage type AC/DC converter 211 for the amplitude and the frequency may be detected. Herein, the first upper control amplifier 272$a$ and the second upper control amplifier 272$b$ may add the low pass element to the output from the first subtractor 271$a$ and the second subtractor 271$b$. According to this, the feedback loop may be stabilized. Also, it is possible to further provide the limiter on the subsequent stage of the first upper control amplifier 272$a$ and the second upper control amplifier 272$b$ and output the outputs from the first upper control amplifier 272$a$ and the second upper control amplifier 272$b$ through the limiter. It is possible to prevent the excessive output to stabilize the control.

The lower level voltage control circuit 260 in FIG. 8 outputs the signal generated such that the amplitude, the frequency, and the phase of the single-phase alternating current approach the synthesized value of the reference voltage, which defines the amplitude of the single-phase alternating current at the AC terminal 222, the voltage command signal, and an electrical angle command signal as the PWM command based on the single-phase alternating current at the AC terminal 222, the electrical angle command signal including the generated electrical angle 257 of the frequency control circuit 250, and the voltage command signal from the upper level voltage control circuit 270. Also, the reference voltage is set in advance by a reference voltage setting unit 261. The reference voltage becomes the reference of the amplitude of the single-phase alternating current at the AC terminal 222.

Specifically, as illustrated in FIG. 9, the reference voltage setting unit 261 sets the reference voltage to output. The second multiplier 265 multiplies the value obtained by multiplying $\sqrt{2}$ by the sine value of the generated electrical angle 257 from the frequency control circuit 250 by the reference voltage from the reference voltage setting unit 261. A first adder 262 adds the voltage command signal from the upper level voltage control circuit 270 and the signal output from the second multiplier 265 to output. A third subtractor 263 subtracts the signal from the output voltage detecting circuit 231 from the signal output by the first adder 262. The voltage controller 264 controls the signal output by the third subtractor 263 such that the single-phase alternating current at the AC terminal 222 approaches the synthesized value of the reference voltage, the voltage command signal, and the electrical angle command signal to output as the PWM command.

According to this, it is possible to compensate the deviation detected by the upper level voltage control circuit 270 and control the amplitude and the phase of the single-phase voltage type AC/DC converter 211 so as to conform the amplitude and the phase of the single-phase alternating current of the single-phase voltage type AC/DC converter 211 when converting from the DC power to the AC power to the amplitude and the phase of the power system. On the other hand, the amplitude and the frequency of the single-phase alternating current at the AC terminal 222 when converting from the AC power to the DC power are detected to be compared with the amplitude and the frequency specified by the upper command vector 520. Then, when the amplitude of the single-phase alternating current at the AC terminal 222 is small, the reactive power is generated so as to increase the voltage at the AC terminal 222, and when the amplitude at the AC terminal 222 is large, the reactive power is decreased so as to decrease the voltage of the single-phase alternating current at the AC terminal 222 (voltage-maintaining characteristics). Also, when the frequency of the single-phase alternating current at the AC terminal 222 is small, the power output from the DC terminal 221 is decreased, and when the frequency of the single-phase alternating current at the AC terminal 222 is large, the power output from the DC terminal 221 is increased (governor-free characteristics).

Also, as a result of the control to "approach the upper command vector 520", the single-phase voltage type AC/DC converter 211 also operates as the three-phase voltage type AC/DC converter 111 described in the first embodiment.

The amplifier may be applied as the voltage controller 264, for example. Herein, it is also possible to further provide the low pass filter between the third subtractor 263 and the voltage controller 264 to output the output from the third subtractor 263 through the low pass filter. It is possible to stabilize the control by the voltage controller 264. It is also possible to further provide the voltage limiter between the third subtractor 263 and the voltage controller 264 (when the low pass filter is provided on this position, between the low pass filter and the voltage controller 264) to output the output from the third subtractor 263 through the voltage limiter. The transient variation of the output voltage at the time of activation of the single-phase voltage type AC/DC converter 211 may be inhibited.

Figure 10:
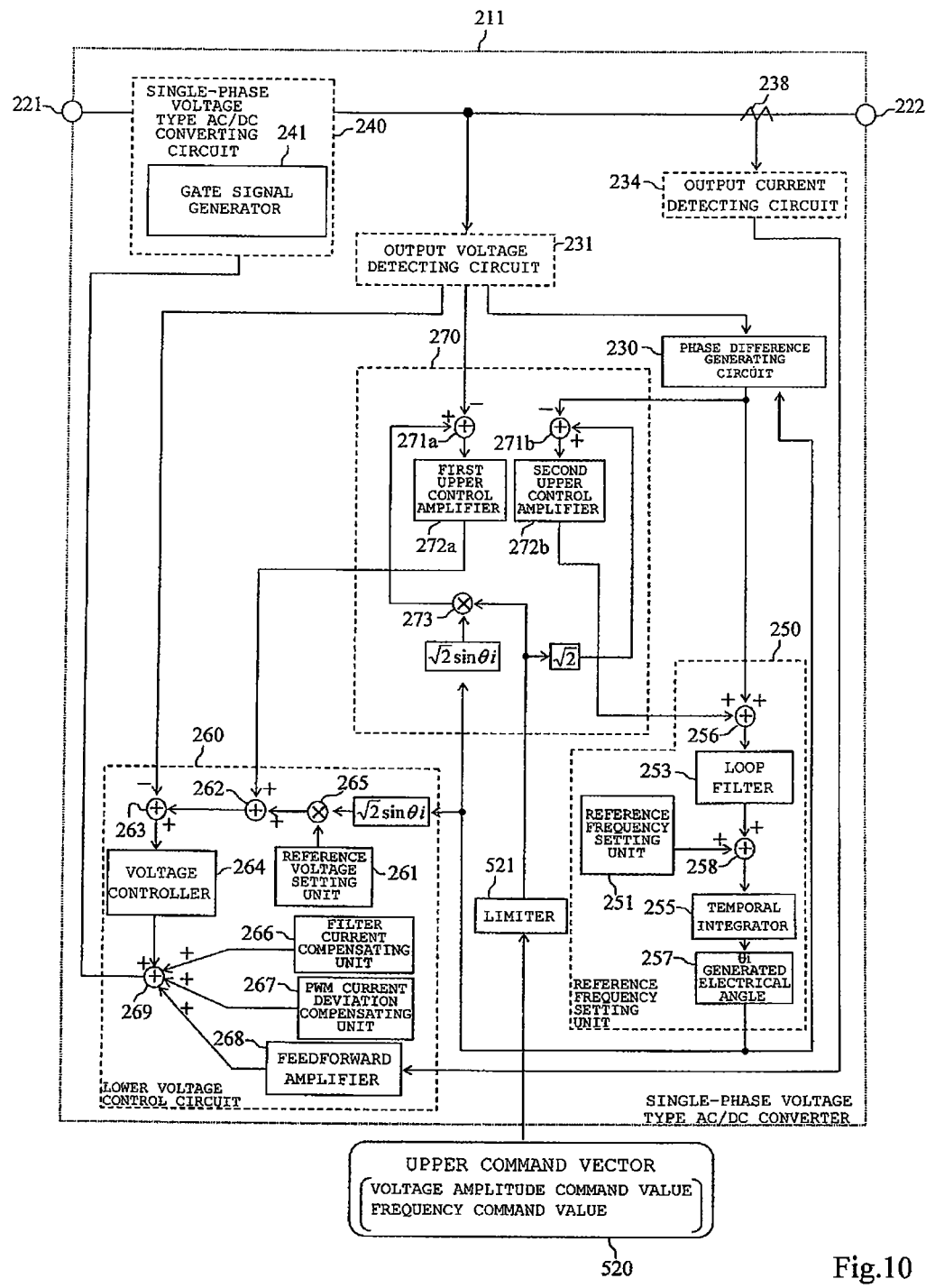
FIG. 10 is a schematic configuration diagram of the single-phase voltage type AC/DC converter according to the present invention.

FIG. 10 is a schematic configuration diagram of the single-phase voltage type AC/DC converter according to another embodiment.

The single-phase voltage type AC/DC converter 211 in FIG. 10 has a mode obtained by further providing an output current detecting circuit 234 for detecting the single-phase AC output current at the AC terminal 222 through a current transformer 238 in the single-phase voltage type AC/DC converter 211 illustrated in FIG. 9 in which the outputs from a filter current compensating unit 266, a PWM current deviation compensating unit 267, and a feedforward amplifier 268 are further added to the output from the voltage controller 264 by a fourth adder 269. In this case, any of the single-phase voltage type AC/DC converting circuits 240-1 and 240-2 illustrated in FIGS. 11 and 12 may be applied as the single-phase voltage type AC/DC converting circuit 240. Therefore, it is assumed that any of the single-phase voltage type AC/DC converting circuits 240-1 and 240-2 illustrated in FIGS. 11 and 12 is applied in FIG. 10.

The filter current compensating unit 266 outputs a current compensation value defined so as to compensate the current loss in the single-phase AC filter circuit 245 (FIG. 11 or 12) in the single-phase voltage type AC/DC converting circuit 240. According to this, the single-phase voltage type AC/DC converter 211 may compensate the current loss by setting the current loss in the single-phase AC filter circuit 245 in FIG. 11 or 12 in the filter current compensating unit 266 in advance to add to the output vector from the voltage controller 264. Also, the PWM current deviation compensating unit 267 outputs a current deviation compensation value defined to compensate the current deviation of the single-phase AC output current from the single-phase voltage type AC/DC converting circuit 240. According to this, the single-phase voltage type AC/DC converter 211 may compensate the current deviation by setting the current deviation in the single-phase voltage type AC/DC converting circuit 240 when the PWM command is set to zero command in the PWM current deviation compensating unit 267 in advance to add to the output vector from the voltage controller 264. Also, the feedforward amplifier 268 amplifies with the predetermined feedforward gain such that the value of the single-phase AC output current detected by the output current detecting circuit 234 is inputted to compensate the current for the load at the AC terminal 222 to output. According to this, the single-phase voltage type AC/DC converter 211 may generate the stable output voltage even when the load current changes by detecting the single-phase AC output current at the AC terminal 222 by the output current detecting circuit 234 and adding the value to the output value from the voltage controller 264 through the feedforward amplifier 268.

The limiter 521 determines the upper limit and the lower limit of the upper command vector 520 to prevent the excessive upper command vector 520 from being inputted to the upper level voltage control circuit 270.

As described above, the single-phase voltage type AC/DC converter 211 in FIGS. 8 to 10 has the internal equivalent impedance, so that this may be connected to the power system as the voltage type to be operated, and since this is provided with the frequency control circuit 250, the upper level voltage control circuit 270, and the lower level voltage control circuit 260, the autonomous parallel operation to autonomously compensate the power deviation for the power system is possible. Therefore, the reliability of the device is improved and the dispersed arrangement becomes possible. Further, when a plurality of devices are operated in parallel, it is possible to operate them without the limitation in the number of devices. Further, since the single-phase voltage type AC/DC converter 211 has the governor-free characteristics, the single-phase voltage type AC/DC converter 211 may increase or decrease the DC power output from the DC terminal 221 according to the frequency of the distribution network. Also, since the single-phase voltage type AC/DC converter 211 has the voltage-maintaining characteristics, the single-phase voltage type AC/DC converter 211 may increase or decrease the reactive power so as to maintain the DC voltage output from the DC terminal 221 constant according to the voltage of the distribution network.

(Third Embodiment)

Figure 16:
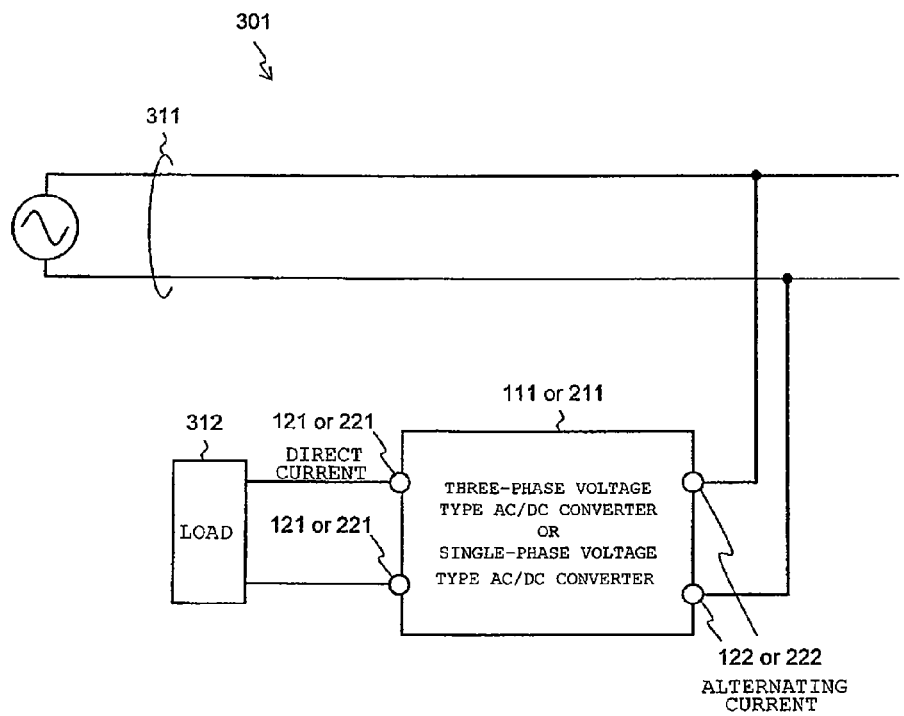
FIG. 16 is a view for illustrating a distribution system according to the present invention.

FIG. 16 is a view for illustrating a distribution system 301 of this embodiment. The distribution system 301 performs a following stabilization control method. In the stabilization control method, the AC terminal (122 or 222) of the voltage type AC/DC converter (111 or 221) is connected to a distribution network 311, the DC terminal (121 or 211) is connected to a load 312, the DC power between the voltage type AC/DC converter (111 or 211) and the load 312 is adjusted such that frequency variation of the AC voltage of the distribution network 311 decreases and the magnitude of the reactive power in the voltage type AC/DC converter (111 or 211) is adjusted such that voltage variation of the AC voltage of the distribution network 311 decreases, according to relationship between the frequency and a voltage amplitude value of the AC voltage of the distribution network 311 and the upper command vector 520.

The distribution system 301 connects the distribution network 311 and the load 312 by the voltage type AC/DC converter (111 or 211). Herein, when the distribution system 301 is of the three-phase alternating current, the voltage type AC/DC converter is the three-phase voltage type AC/DC converter 111 described in the first embodiment, and when the distribution system 301 is of the single-phase alternating current, the voltage type AC/DC converter is the single-phase voltage type AC/DC converter 211 described in the second embodiment. Meanwhile, when the distribution system 301 is of the three-phase alternating current, the voltage type AC/DC converter is not limited to the three-phase voltage type AC/DC converter 111 and may be one single-phase voltage type AC/DC converter 211 or a combination of a plurality of single-phase voltage type AC/DC converters 211.

Figure 18:
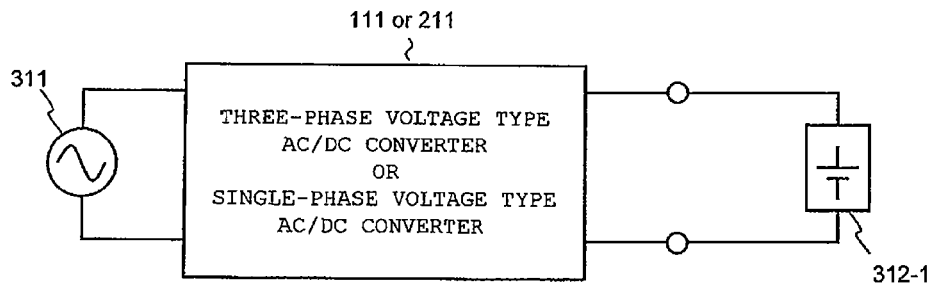
FIG. 18 is a specific example of a load.
Figure 19:
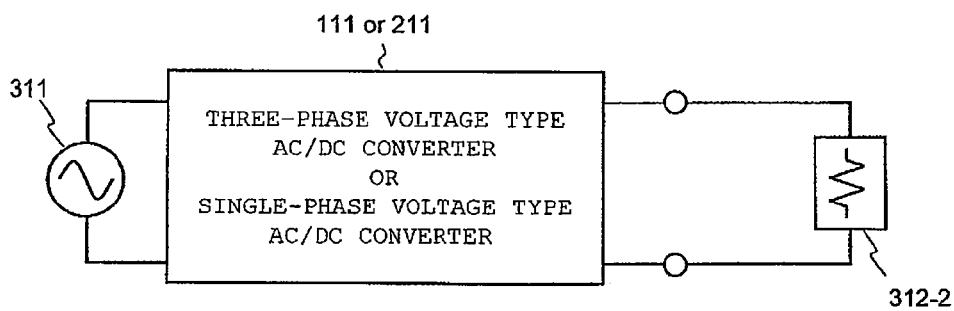
FIG. 19 is a specific example of the load.
Figure 20:
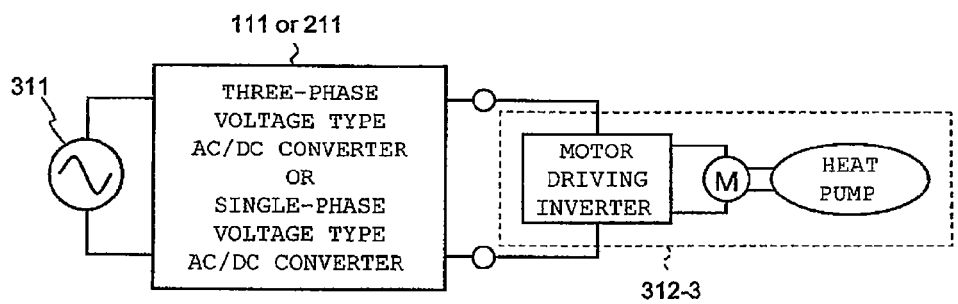
FIG. 20 is a specific example of the load.

The load 312 is a device of which high-speed response is not required with a long control constant, which may control in a time average manner in a relatively long period of time. The long control constant is longer than a time in which the three-phase voltage type AC/DC converter 111 or the single-phase voltage type AC/DC converter 211 feeds back to converge variation when the DC voltage at the DC terminal (121 or 211) varies. The load 312 is, for example, a storage battery and a thermal source device. Specifically, when this is the storage battery, this is a battery for smoothing the load and the battery of an electrical vehicle/hybrid vehicle. FIG. 18 is a view of a case in which a battery 312-1 is connected to the distribution network 311 through the voltage type AC/DC converter (111 or 211). When this is the thermal source device, this is an electrical heater, an IH cooking heater, an electrical water heater, a heat pump/EcoCute driving inverter and the like. FIG. 19 is a view of a case in which an electrical heater 312-2 is connected to the distribution network 311 through the voltage type AC/DC converter (111 or 211). FIG. 20 is a view of a case in which a heat pump/EcoCute driving inverter 312-3 is connected to the distribution network 311 through the voltage type AC/DC converter (111 or 211).

First, operation of the distribution system 301 when the load 312 is the electrical water heater is described. In this example, the voltage type AC/DC converter (111 or 211) operates as a rectifier. When the frequency of the alternating current of the distribution network 311 from which the power is received decreases while heating the heated water, the voltage type AC/DC converter (111 or 211) automatically decreases the DC power to be output according to the governor-free characteristics (F-P characteristics) of itself. On the other hand, when the frequency of the alternating current of the distribution network 311 from which the power is received increases while heating the heated water, the voltage type AC/DC converter (111 or 211) automatically increases the DC power to be output according to the governor free characteristics.

In this manner, the voltage type AC/DC converter (111 or 211) increases or decreases the DC power to be converted according to the variation of the frequency of the distribution network 311 to try to absorb the variation of the frequency of the distribution network 311, so that this contributes to stabilize the frequency of the distribution network 311. Also, since an average of the frequency of the distribution network 311 in a heating period of heated water is considered to be substantially a rated frequency, the voltage type AC/DC converter (111 or 211) may also maintain performance of the water heater.

Also, when the AC voltage of the distribution network 311 from which the power is received decreases while heating the heated water, the voltage type AC/DC converter (111 or 211) tries to maintain the AC voltage according to the voltage-maintaining characteristics (V-Q characteristics) of itself and automatically generates the reactive power required for this. On the other hand, when the AC voltage of the distribution network 311 from which the power is received increases while heating the heated water, the voltage type AC/DC converter (111 or 211) tries to maintain the AC voltage according to the voltage-maintaining characteristics of itself and automatically absorbs the reactive power required for this.

In this manner, the voltage type AC/DC converter (111 or 211) increases or decreases the reactive power according to the variation of the AC voltage of the distribution network 311 to try to absorb the variation of the AC voltage of the distribution network 311, so that this contributes to stabilize the voltage of the distribution network 311.

Subsequently, the operation of the distribution system 301 when the load 312 is the storage battery is described. When the load 312 is the storage battery, although the operation of the voltage type AC/DC converter (111 or 211) at the time of charge (when receiving the power from the distribution network 311) is identical to that in the description of the electrical water heater, the voltage type AC/DC converter (111 or 211) at the time of discharge operates as the inverter as follows.

When the frequency of the alternating current of the distribution network 311 decreases at the time of the discharge of the storage battery, the voltage type AC/DC converter (111 or 211) automatically increases the AC power to be output according to the governor-free characteristics of itself. On the other hand, when the frequency of the distribution network 311 increases at the time of the discharge of the storage battery, the voltage type AC/DC converter (111 or 211) automatically decreases the AC power to be output according to the governor-free characteristics of itself.

In this manner, the voltage type AC/DC converter (111 or 211) increases or decreases the AC power to be output according to the variation of the frequency of the distribution network 311 to try to absorb the variation of the frequency of the distribution network 311, so that this contributes to stabilize the frequency of the distribution network 311. Also, it is considered that the average of the frequency of the distribution network 311 in a discharge period is substantially the rated frequency, so that the voltage type AC/DC converter (111 or 211) may also maintain the performance of the storage battery.

Also, when the AC voltage of the distribution network 311 decreases at the time of the discharge of the storage battery, the voltage type AC/DC converter (111 or 211) tries to maintain the AC voltage at the AC terminal (122 or 222) according to the voltage-maintaining characteristics (V-Q characteristics) of itself and automatically generates the reactive power required for this. On the other hand, when the AC voltage of the distribution network 311 increases at the time of the discharge of the storage battery, the voltage type AC/DC converter (111 or 211) tries to maintain the AC voltage at the AC terminal (122 or 222) according to the voltage-maintaining characteristics of itself and automatically absorbs the reactive power required for this.

In this manner, the voltage type AC/DC converter (111 or 211) increases or decreases the reactive power according to the variation of the AC voltage of the distribution network 311 to try to absorb the variation of the AC voltage of the distribution network 311, so that this contributes to stabilize the voltage of the distribution network 311. Also, it is considered that the average of the AC frequency of the distribution network 311 in the discharge period of the storage battery is substantially the rated frequency, so that the voltage type AC/DC converter (111 or 211) may also maintain the performance of the storage battery.

As the distribution system 301 in FIG. 16, by connecting the voltage type AC/DC converter (111 or 211) between the distribution network 311 and the load 312, the load 312 may contribute to stabilize the system frequency and the system voltage of the distribution network 311. In other words, by configuring the system such as the distribution system 301, an effect similar to that in a case in which the number of variable speed pumped storage power plants increases may be obtained.

(Fourth Embodiment)

Figure 17:
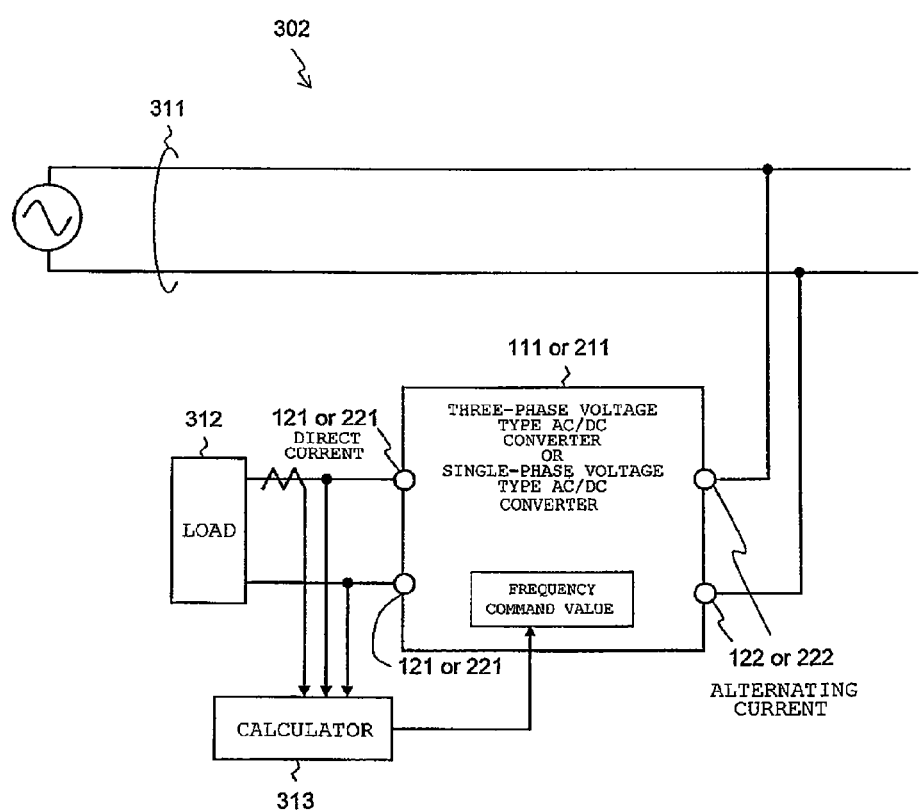
FIG. 17 is a view illustrating the distribution system according to the present invention.

FIG. 17 is a view illustrating a distribution system 302 of this embodiment. Difference between the distribution system 302 and the distribution system 301 in FIG. 16 is that the distribution system 302 is provided with a calculator 313. The calculator 313 obtains at least a piece of information out of the DC voltage and a direct current between the voltage type AC/DC converter (111 or 211) and the load 312 and performs comparison operation of the same with a predetermined value, and inputs the same as the frequency command value of the upper command vector 520 to the voltage type AC/DC converter (111 or 211).

By setting a rated voltage or a rated current of the load 312 in the calculator 313 as a predetermined value, extreme variation of the DC power by the frequency variation of the distribution network 311 may be prevented.

DESCRIPTION OF REFERENCE NUMERALS

111: three-phase voltage type AC/DC converting device
121, 121-1, 121-2: DC terminal
122, 122-1, 122-2, 122-3: AC terminal
124, 125, 126: AC terminal
131: UM converting circuit
132: M converting circuit
133: U converting circuit
134: current detecting circuit
135: UM converting circuit
140: three-phase voltage type AC/DC converting circuit
140-1, 140-2: three-phase voltage type AC/DC converting circuit
141: gate signal generator
142: three-phase voltage type AC/DC converting unit
143: current detecting circuit
144: voltage detecting circuit
145: three-phase AC filter circuit
146a-146f: diode
146g-146l: self-extinguishing switch
147a-147c: resistance
147d-147f: current controlling inductor
147g-147i: capacitor
150: frequency controlling circuit
151: reference frequency setting unit
152: rotational coordinate transformation matrix
153: loop filter
154: first temporal integrator
155: second temporal integrator
156: adder
157: generated value
160: first inferior voltage controlling circuit
161: first reference voltage vector setting unit
162: adder
163: subtractor
164: first voltage controller
165: first inverted U converting unit
166: filter current compensating unit
167: PWM current deviation compensating unit
168: feedforward amplifier
169: adder
170: first superior voltage controlling circuit
171: subtractor
172: first superior control amplifier
211: single-phase voltage type AC/DC converting device
221, 221-1, 221-2: DC terminal
222: AC terminal
222-1, 222-3: AC terminal
223: DC voltage sauce
224, 226: AC terminal
230: phase difference generating circuit
231: output voltage detecting circuit
233-1 to 233-3: terminal
234: output current detecting circuit
235: phase delay single-phase AC generator
236: phase difference voltage generator
238: current transformer
240: single-phase voltage type AC/DC converting circuit
240-1, 240-2: single-phase voltage type AC/DC converting circuit
241: gate signal generator
242: single-phase voltage type AC/DC converting unit
243: current detecting circuit
244: voltage detecting circuit
245: single-phase AC filter circuit
246a, 246b, 246e, 246f: diode
246g, 246h, 246k, 246l: self-extinguishing switch
247a: resistance
247d: inductor
247g: capacitor
250: frequency controlling circuit
251: reference frequency setting unit
252: rotational coordinate transformation matrix
253: loop filter
255: temporal integrator
256: second adder
257: generated electrical angle
258: third adder
260: inferior voltage controlling circuit
261: reference voltage setting unit
262: first adder
263: third subtractor
264: voltage controller
265: second multiplier
266: filter current compensating unit
267: PWM current deviation compensating unit
268: feedforward amplifier
269: fourth adder
270: superior voltage controlling circuit
271a: first subtractor
271b: second subtractor
272a: first superior control amplifier
272b: second superior control amplifier
273: first multiplier 301, 302: distribution system
311: distribution network
312: load
312-1: battery
312-2: electrical heater
312-3: heat pump/EcoCute driving inverter
313: calculator
520: superior command vector
521: limiter

What is claimed is:

1. A single-phase voltage type AC/DC converter, comprising:
   a single-phase voltage type AC/DC converting circuit, which has internal equivalent impedance as seen from an AC terminal, for converting single-phase AC power from a single-phase AC source to DC power to output from a DC terminal according to pulse width modulation of gate signals generated based on a PWM command;
   a phase difference generating circuit, which has a phase delay single-phase AC generator for delaying a phase of a single-phase AC output voltage at the AC terminal and generating a delay single-phase alternating current, for generating a phase difference voltage corresponding to phase difference between the single-phase AC output voltage at the AC terminal and an internal electromotive voltage of the single-phase voltage type AC/DC converting circuit based on the delay single-phase alternating current;
   an upper level voltage control circuit to which an upper command vector composed of a voltage amplitude command value and a frequency command value of the single-phase AC output voltage at the AC terminal is inputted for outputting a voltage command signal and a frequency command signal generated such that the amplitude and the frequency of the single-phase AC output voltage at the AC terminal approach the command values by the upper command vector based on the inputted upper command vector, the phase difference voltage from the phase difference generating circuit, and the single-phase AC output voltage at the AC terminal;
   a frequency control circuit for determining an electrical angle of the internal electromotive voltage of the single-phase voltage type AC/DC converting circuit to generate a generated electrical angle based on a reference frequency to define the frequency of the single-phase AC output voltage at the AC terminal, the frequency command signal from the upper level voltage control circuit, and an output signal from the phase difference generating circuit; and
   a lower level voltage control circuit for outputting a signal generated such that the amplitude, the frequency, and the phase of the single-phase AC output voltage approach a synthesized value of a reference voltage to define the amplitude of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the upper level voltage control circuit.

2. A single-phase voltage type AC/DC converter, comprising:
   a single-phase voltage type AC/DC converting circuit, which has internal equivalent impedance as seen from an AC terminal, for converting DC power from a DC voltage type connected to a DC terminal to single-phase AC power and outputting the single-phase AC power to the AC terminal or converting single-phase AC power from a single-phase AC source connected to the AC terminal to DC power and outputting the DC power to the DC terminal, according to pulse width modulation of gate signals generated based on a PWM command;
   a phase difference generating circuit, which has a phase delay generator for delaying a phase of a single-phase AC output voltage at the AC terminal to generate a delay single-phase alternating current, for generating a phase difference voltage corresponding to phase difference between the single-phase AC output voltage at the AC terminal and an internal electromotive voltage of the single-phase voltage type AC/DC converting circuit based on the delay single-phase alternating current;
   an upper level voltage control circuit to which an upper command vector composed of a voltage amplitude command value and a frequency command value of the singe-phase AC output voltage at the AC terminal is inputted for outputting a voltage command signal and a frequency command signal generated such that the amplitude and the frequency of the single-phase AC output voltage at the AC terminal approach the command values by the upper command vector based on the inputted upper command vector, the phase difference voltage from the phase difference generating circuit, and the single-phase AC output voltage at the AC terminal;
   a frequency control circuit for determining an electrical angle of the internal electromotive voltage of the single-phase voltage type AC/DC converting circuit based on a reference frequency to define the frequency of the single-phase AC output voltage at the AC terminal, the frequency command signal from the upper level voltage control circuit, and an output signal from the phase difference generating circuit to generate a generated electrical angle; and
   a lower level voltage control circuit for outputting a signal generated such that the amplitude, the frequency, and the phase of the single-phase AC output voltage approach a synthesized value of a reference voltage to define the amplitude of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the upper level voltage control circuit.

3. The single-phase voltage type AC/DC converter according to claim 1, wherein the AC terminal is connected to a distribution network of a single-phase alternating current, and the DC terminal is connected to a DC device that is a load,
   when the frequency of a single-phase AC voltage of the distribution network is larger than a frequency command value of the upper command vector, DC power based on a difference between the frequency of the single-phase AC voltage of the distribution network and the frequency command value of the upper command vector is increased and supplied to the DC device, and when the frequency of the single-phase AC voltage of the distribution network is smaller than the frequency command value of the upper command vector, DC power based on a difference between the frequency of the single-phase AC voltage of the distribution network and the frequency command value of the upper command vector is decreased and supplied to the DC device, and
   when the single-phase AC voltage of the distribution network is higher than a voltage command value of the upper command vector, reactive power based on a difference between the single-phase AC voltage of the distribution network and the voltage command value of the upper command value is decreased, and when the single-phase AC voltage of the distribution network is lower than the command value of the upper command vector, reactive power based on a difference between the single-phase AC voltage of the distribution network and the voltage command value of the upper command value is increased.

4. The single-phase voltage type AC/DC converter according to claim 3, wherein information is obtained out of the DC voltage and the direct current between the single-phase voltage type AC/DC converter and the DC device to perform a comparison operation with a predetermined value; and inputting to the single-phase voltage type AC/DC converter as the frequency command value of the upper command vector.

5. A three-phase voltage type AC/DC converter, comprising:
   a three-phase voltage type AC/DC converting circuit, which has internal equivalent impedance as seen from an AC terminal, for converting three-phase AC power from a three-phase AC source to DC power and outputting the DC power through a DC terminal, according to pulse width modulation of gate signals generated based on a PWM command;
   a UM converting circuit for converting a three-phase output voltage at the AC terminal on a dq rotational coordinate space of which the d-axis component is a component related to amplitude of the three-phase voltage and of which the q-axis component is a component related to frequency difference to output;
   an upper level voltage control circuit to which an upper command vector composed of a voltage amplitude command value and a frequency command value of the three-phase output voltage at the AC terminal is inputted for outputting a signal generated such that the amplitude and frequency of the three-phase output voltage at the AC terminal approach command values by the upper command vector as a voltage command vector based on the inputted upper command vector and an output voltage vector from the UM converting circuit;
   a lower level voltage control circuit for outputting the signal generated such that the amplitude and phase of the three-phase output voltage approach a synthesized value of a reference voltage vector and the voltage command vector as the PWM command based on the reference voltage vector to define the amplitude and the phase of the three-phase output voltage at the AC terminal, the output voltage vector from the UM converting circuit, and the voltage command vector from the upper level control circuit; and
   a frequency control circuit for synchronizing a generated value based on a reference frequency to define the frequency of the three-phase output voltage at the AC terminal and the q-axis component of the output voltage vector from the UM converting circuit with a rotational angle of a transformation matrix in the UM converting circuit, and wherein the AC terminal is connected to a distribution network of a three-phase alternating current, and the DC terminal is connected to a DC device that is a load;
   when the frequency of a three-phase AC voltage of the distribution network is larger than a frequency command value of the upper command vector, DC power based on a difference between the frequency of the three-phase AC voltage of the distribution network and the frequency command value of the upper command vector is increased and supplied to the DC device, when the frequency of the three-phase AC voltage of the distribution network is smaller than the frequency command value of the upper command vector, DC power based on a difference between the frequency of the three-phase AC voltage of the distribution network and the frequency command value of the upper command vector is decreased and supplied to the DC device, and
   when the three-phase AC voltage of the distribution network is higher than a voltage command value the upper command vector, reactive power based on a difference between the three-phase AC voltage of the distribution network and the command value of the upper command vector is decreased and when the three-phase AC voltage of the distribution network is lower than the voltaqe command value of the upper command vector, reactive power based on a difference between the three-phase AC voltage of the distribution network and the voltaqe command value of the upper command vector is increased.

6. A three-phase voltage type AC/DC converter according to claim 5, wherein at least a piece of information is obtained out of the DC voltage and the direct current between the three-phase voltage type AC/DC converter and the DC device to perform comparison operation with a predetermined value; and inputting to the three-phase voltage type AC/DC converter as the frequency command value of the upper command vector.

7. The single-phase voltage type AC/DC converter according to claim 2, wherein
   the AC terminal is connected to a distribution network of a single-phase alternating current, and the DC terminal is connected to a chargeable and dischargeable DC device,
   when the frequency of a single-phase AC voltage of the distribution network is larger than a frequency command value of the upper command vector, DC power based on a difference between the single-phase AC voltage of the distribution network and the voltage command value of the upper command vector is decreased and supplied to the DC device, when the frequency of the single-phase AC voltage of the distribution network is smaller than the frequency command value of the upper command vector, AC power based on a difference between the frequency of the single-phase AC voltage of the distribution network and the frequency command value of the upper command vector is supplied to the DC device, and
   when the single-phase AC voltage of the distribution network is higher than a voltage command value of the upper command vector, reactive power based on a difference between the single-phase AC voltage of the distribution network and the voltage command value of the upper command vector is decreased and when the single-phase AC voltage of the distribution network is lower than the voltage command value of the upper command vector, reactive power based on a difference between the single-phase AC voltage of the distribution network and the voltage command value of the upper command vector is increased.

8. The single-phase AC converter according to claim 7, wherein information is obtained out of the DC voltage and the direct current between the single-phase voltage type AC/DC converter and the DC device to perform comparison operation with a predetermined value; and inputting to the single-phase voltage type AC/DC converter as the frequency command value of the upper command vector.

9. A three-phase voltage type AC/DC converter, comprising:
- a three-phase voltage type AC/DC converting circuit, which has internal equivalent impedance as seen from an AC terminal, for converting power from a DC power source connected to a DC terminal to a three-phase AC power to output from the AC terminal or converting three-phase AC power from a three-phase AC source connected to the AC terminal to DC power to output from the DC terminal, according to pulse width modulation of gate signals generated based on a PWM command;
- a UM converting circuit for converting a three-phase output voltage at the AC terminal on a dq rotational coordinate space of which the d-axis component is a component related to amplitude of the three-phase voltage and of which the q-axis component is a component related to frequency difference to output;
- an upper level voltage control circuit to which an upper command vector composed of a voltage amplitude command value and a frequency command value of the three-phase output voltage at the AC terminal is inputted for outputting a signal generated such that the amplitude and frequency of the three-phase output voltage at the AC terminal approach command values by the upper command vector based on the inputted upper command vector from the UM converting circuit as a voltage command vector;
- a lower level voltage control circuit for outputting the signal generated such that the amplitude and phase of the three-phase output voltage approach a synthesized value of a reference voltage vector and the voltage command vector as the PWM command based on the reference voltage vector to define the amplitude and the phase of the three-phase output voltage at the AC terminal, the output voltage vector from the UM converting circuit, and the voltage command vector from the upper level control circuit; and
- a frequency control circuit for synchronizing a generated value based on a reference frequency to define the frequency of the three-phase output voltage at the AC terminal and the q-axis component of the output voltage vector from the UM converting circuit with a rotational angle of a transformation matrix in the UM converting circuit, and wherein the AC terminal is connected to a distribution network of a three-phase alternating current, and the DC terminal is connected to a chargeable and dischargeable DC device;
- when the frequency of a three-phase AC voltage of the distribution network is larger than a frequency command value of the upper command vector, DC power based on a difference between the frequency of the three-phase AC voltage of the distribution network and the frequency command value of the upper command vector is supplied to the DC device, when the frequency of the three-phase AC voltage of the distribution network is smaller than the frequency command value of the upper command vector, AC power based on a difference between the frequency of the three-phase AC voltage of the distribution network and the frequency command value of the upper command vector is supplied to the DC device; and
- when the three-phase AC voltage of the distribution network is higher than a voltage command value the upper command vector, reactive power based on a difference between the three-phase AC voltage of the distribution network and the command value of the upper command vector is decreased and when the three-phase AC voltage of the distribution network is lower than the voltage command value of the upper command vector, reactive power based on a difference between the three-phase AC voltage of the distribution network and the voltage command value of the upper command vector is increased.

10. A three-phase voltage type AC/DC converter according to claim 9, wherein information is obtained out of the DC voltage and the direct current between the three-phase voltage type AC/DC converter and the DC device to perform comparison operation with a predetermined value; and inputting to the three-phase voltage type AC/DC converter as the frequency command value of the upper command vector.

11. A method for converting single-phase AC power from a single-phase AC source to DC power to output from a DC terminal according to pulse width modulation of gate signals generated based on a PWM command, said method comprising:
- with a phase difference generating circuit, delaying a single-phase AC output voltage at an AC terminal and an internal electromotive voltage of a single-phase voltage type AC/DC converting circuit based on a delay single-phase alternating current;
- inputting to an upper level voltage control circuit an upper command vector composed of a voltage amplitude command value and a frequency command value of the single-phase AC output voltage at the AC terminal;
- outputting a voltage command signal and a frequency command signal generated such that an amplitude and a frequency of the single-phase AC output voltage at the AC terminal approach the command values by the upper command vector based on the upper command vector, a phase difference voltage from a phase difference generating circuit, and the single-phase AC output voltage at the AC terminal;
- determining with a frequency control circuit an electrical angle of the internal electromotive voltage of the single-phase voltage type AC/DC converting circuit to generate a generated electrical angle based on a reference frequency to define the frequency of the single-phase AC output voltage at the AC terminal, the frequency command signal from the upper level voltage control circuit, and an output signal from the phase difference generating circuit; and
- outputting with a lower level voltage control circuit a signal generated such that the amplitude, the frequency, and the phase of the single-phase AC output voltage approach a synthesized value of a reference voltage to define the amplitude of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the upper level voltage control circuit.

12. A method for converting DC power from a DC voltage type connected to a DC terminal to single-phase AC power, said method comprising:
- providing a single-phase voltage type converting circuit, which has internal equivalent impedance as seen from an AC terminal, for converting DC power from a DC voltage type connected to a DC terminal to single-phase AC power;
- outputting the single-phase AC power to the AC terminal or converting single-phase AC power from a single-phase AC source connected to the AC terminal to DC power and outputting the DC power to the DC terminal, according to pulse width modulation of gate signals generated based on a PWM command;

delaying a phase of a single-phase AC output voltage at the AC terminal to generate a delay single-phase alternating current, for generating a phase difference voltage corresponding to phase difference between the single-phase AC output voltage at the AC terminal and an internal electromotive voltage of the single-phase voltage type AC/DC converting circuit based on the delay single-phase alternating current;

inputting to an upper level voltage control circuit an upper command vector composed of a voltage amplitude command value and a frequency command value of the singe-phase AC output voltage at the AC terminal;

outputting a voltage command signal and a frequency command signal generated such that the amplitude and the frequency of the single-phase AC output voltage at the AC terminal approach the command values by the upper command vector based on the inputted upper command vector, the phase difference voltage from the phase difference generating circuit, and the single-phase AC output voltage at the AC terminal;

determining with a frequency control circuit an electrical angle of the internal electromotive voltage of the single-phase voltage type converting circuit based on a reference frequency to define the frequency of the single-phase AC output voltage at the AC terminal, the frequency command signal from the upper level voltage control circuit, and an output signal from the phase difference generating circuit to generate a generated electrical angle; and outputting with a lower level voltage control circuit a signal generated such that the amplitude, the frequency, and the phase of the single-phase AC output voltage approach a synthesized value of a reference voltage to define the amplitude of the single-phase AC output voltage at the AC terminal, the voltage command signal, and the generated electrical angle as the PWM command based on the single-phase AC output voltage at the AC terminal, the generated electrical angle of the frequency control circuit, and the voltage command signal from the upper level voltage control circuit.

13. The method according to claim 11, further comprising:
connecting the AC terminal to a distribution network of a single-phase alternating current and the DC terminal to a DC device that is a load;

when the frequency of a single-phase AC voltage of the distribution network is larger than a frequency command value of the upper command vector, increasing and supplying to the DC device DC power based on a difference between the frequency of the single-phase AC voltage of the distribution network and the frequency command value of the upper command vector;

when the frequency of the single-phase AC voltage of the distribution network is smaller than the frequency command value of the upper command vector, decreasing and supplying DC power to the DC device based on a difference between the frequency of the single-phase AC voltage of the distribution network and the frequency command value of the upper command vector;

when the single-phase AC voltage of the distribution network is higher than a voltage command value of the upper command vector, decreasing reactive power based on a difference between the single-phase AC voltage of the distribution network and the voltage command value of the upper command value; and when the single-phase AC voltage of the distribution network is lower than the command value of the upper command vector, increasing reactive power based on a difference between the single-phase AC voltage of the distribution network and the voltage command value of the upper command value.

14. The method according to claim 13, further comprising:
obtaining information from the DC voltage and the direct current between the single-phase voltage type AC/DC converter and the DC device to perform a comparison operation with a predetermined value; and inputting to the single-phase voltage type AC/DC converter as the frequency command value of the upper command vector.

15. A method for converting three-phase power from a three-phase AC source to DC power, said method comprising:
providing a three-phase voltage type AC/DC converting circuit, which has internal equivalent impedance as seen from an AC terminal, for converting three-phase power from a three-phase AC source to DC power;

outputting the DC power through a DC terminal, according to pulse width modulation of gate signals generated based on a PWM command;

converting with a UM converting circuit a three-phase output voltage at the AC terminal on a dq rotational coordinate space of which the d-axis component is a component related to amplitude of the three-phase voltage and of which the q-axis component is a component related to frequency difference to output;

inputting to an upper level voltage control circuit an upper command vector composed of a voltage amplitude command value and a frequency command value of the three-phase output voltage at the AC terminal;

outputting a signal generated such that the amplitude and frequency of the three-phase output voltage at the AC terminal approach command values by the upper command vector as a voltage command vector based on the inputted upper command vector and an output voltage vector from the UM converting circuit;

with a lower level voltage control circuit, outputting the signal generated such that the amplitude and phase of the three-phase output voltage approach a synthesized value of a reference voltage vector and the voltage command vector as the PWM command based on the reference voltage vector to define the amplitude and the phase of the three-phase output voltage at the AC terminal, the output voltage vector from the UM converting circuit, and the voltage command vector from the upper level control circuit;

with a frequency control circuit, synchronizing a generated value based on a reference frequency to define the frequency of the three-phase output voltage at the AC terminal and the q-axis component of the output voltage vector from the UM converting circuit with a rotational angle of a transformation matrix in the UM converting circuit, wherein the AC terminal is connected to a distribution network of a three-phase alternating current, and the DC terminal is connected to a DC device that is a load;

when the frequency of a three-phase AC voltage of the distribution network is larger than a frequency command value of the upper command vector, increasing and supplying DC power to the DC device based on a difference between the frequency of the three-phase AC voltage of the distribution network and the frequency command value of the upper command vector;

when the frequency of the three-phase AC voltage of the distribution network is smaller than the frequency command value of the upper command vector, decreasing and supplying DC power to the DC device based on a difference between the frequency of the three-phase AC voltage of the distribution network and the frequency command value of the upper command vector;

when the three-phase AC voltage of the distribution network is higher than a voltage command value the upper command vector, decreasing reactive power based on a difference between the three-phase AC voltage of the distribution network and the command value of the upper command vector; and when the three-phase AC voltage of the distribution network is lower than the voltage command value of the upper command vector, increasing reactive power based on a difference between the three-phase AC voltage of the distribution network and the voltage command value of the upper command vector.

16. The method according to claim 15, further comprising:
obtaining information from the DC voltage and the direct current between the three-phase voltage type AC/DC converter and the DC device to perform comparison operation with a predetermined value; and inputting to the three-phase voltage type AC/DC converter as the frequency command value of the upper command vector.

17. A method according to claim 12, further comprising:
connecting the AC terminal to a distribution network of a single-phase alternating current and the DC terminal to a chargeable and dischargeable DC device;

when the frequency of a single-phase AC voltage of the distribution network is larger than a frequency command value of the upper command vector, supplying DC power to the DC device based on a difference between the single-phase AC voltage of the distribution network and the voltage command value of the upper command vector;

when the frequency of the single-phase AC voltage of the distribution network is smaller than the frequency command value of the upper command vector, supplying AC power to the DC device based on a difference between the frequency of the single-phase AC voltage of the distribution network and the frequency command value of the upper command vector;

when the single-phase AC voltage of the distribution network is higher than a voltage command value of the upper command vector, decreasing the reactive power based on a difference between the single-phase AC voltage of the distribution network and the command value of the upper command vector;

when the single-phase AC voltage of the distribution network is lower than the voltage command value of the upper command vector, increasing reactive power based on a difference between the single-phase AC voltage of the distribution network and the voltage command value of the upper command vector.

18. The method according to claim 17, further comprising:
obtaining information from the DC voltage and the direct current between the single-phase voltage type AC/DC converter and the DC device to perform comparison operation with a predetermined value; and inputting to the single-phase voltage type AC/DC converter as the frequency command value of the upper command vector.

19. A method for converting DC power from a DC voltage type to three phase AC power or three-phase AC power to DC power, said method comprising:
providing a three-phase voltage type AC/DC converting circuit, which has internal equivalent impedance as seen from an AC terminal, for converting power from a DC power source connected to a DC terminal to a three-phase AC power connected to the AC terminal or converting three-phase AC power from a three-phase AC source connected to the AC terminal to DC power to output from the DC terminal, according to pulse width modulation of gate signals generated based on a PWM command;

with a UM converting circuit, converting a three-phase output voltage at the AC terminal on a dq rotational coordinate space of which the d-axis component is a component related to amplitude of the three-phase voltage and of which the q-axis component is a component related to frequency difference to output;

inputting an upper command vector composed of a voltage amplitude command value and a frequency command value of the three-phase output voltage at the AC terminal to an upper level voltage control circuit;

outputting a signal generated such that the amplitude and frequency of the three-phase output voltage at the AC terminal approach command values by the upper command vector based on the inputted upper command vector from the UM converting circuit as a voltage command vector;

with a lower level voltage control circuit, outputting the signal generated such that the amplitude and phase of the three-phase output voltage approach a synthesized value of a reference voltage vector and the voltage command vector as the PWM command based on the reference voltage vector to define the amplitude and the phase of the three-phase output voltage at the AC terminal, the output voltage vector from the UM converting circuit, and the voltage command vector from the upper level control circuit;

with a frequency control circuit, synchronizing a generated value based on a reference frequency to define the frequency of the three-phase output voltage at the AC terminal and the q-axis component of the output voltage vector from the UM converting circuit with a rotational angle of a transformation matrix in the UM converting circuit; and wherein the AC terminal is connected to a distribution network of a three-phase alternating current, and the DC terminal is connected to a chargeable and dischargeable DC device, wherein the AC terminal is connected to a distribution network of a three-phase alternating current, and the DC terminal is connected to a chargeable and dischargeable DC device;

when the frequency of a three-phase AC voltage of the distribution network is larger than a frequency command value of the upper command vector, supplying DC power to the DC device based on a difference between the frequency of the three-phase AC voltage of the distribution network and the frequency command value of the upper command vector;

when the frequency of the three-phase AC voltage of the distribution network is smaller than the frequency command value of the upper command vector, supplying AC power to the DC device based on a difference between the frequency of the three-phase AC voltage of the distribution network and the frequency command value of the upper command vector;

when the three-phase AC voltage of the distribution network is higher than a voltage command value the upper command vector, decreasing reactive power based on a difference between the three-phase AC voltage of the distribution network and the command value of the upper command vector; and when the three-phase AC voltage of the distribution network is lower than the voltage command value of the upper command vector, increasing reactive power based on a difference between the three-phase AC voltage of the distribution network and the voltage command value of the upper command vector.

20. The method according to claim 19, further comprising:

obtaining information from the DC voltage and the direct current between the three-phase voltage type AC/DC converter and the DC device to perform a comparison operation with a predetermined value; and inputting the information to the three-phase voltage type AC/DC converter as the frequency command value of the upper command vector.

* * * * *